(12) United States Patent
Foodman et al.

(10) Patent No.: US 12,166,450 B2
(45) Date of Patent: Dec. 10, 2024

(54) MEDIUM VOLTAGE INRUSH CURRENT REGULATION AND INTERCONNECTION CONTROL SYSTEM AND METHOD

(71) Applicant: ADERIS ENERGY, LLC, Cornelius, NC (US)

(72) Inventors: Adam Will Foodman, Charlotte, NC (US); Bradley Allan Micallef, Davidson, NC (US); Olee Joel Olsen, Jr., Cornelius, NC (US)

(73) Assignee: ADERIS ENERGY, LLC, Cornelius, NC (US)

( * ) Notice: Subject to any disclaimer, the term of this patent is extended or adjusted under 35 U.S.C. 154(b) by 0 days.

(21) Appl. No.: 18/520,184

(22) Filed: Nov. 27, 2023

(65) Prior Publication Data

US 2024/0120863 A1 Apr. 11, 2024

Related U.S. Application Data

(63) Continuation of application No. 17/836,804, filed on Jun. 9, 2022, now Pat. No. 11,831,271.

(Continued)

(51) Int. Cl.
*H02P 9/08* (2006.01)
*H02H 9/00* (2006.01)
(Continued)

(52) U.S. Cl.
CPC ............. *H02P 9/08* (2013.01); *H02H 9/002* (2013.01); *H02H 9/02* (2013.01); *H02J 3/381* (2013.01); *H02J 2300/24* (2020.01)

(58) Field of Classification Search
CPC ... H02P 9/08; H02H 9/02; H02H 9/002; H02J 3/381; H02J 2300/24
See application file for complete search history.

(56) References Cited

U.S. PATENT DOCUMENTS 2,482,493 A 9/1949 King
4,562,382 A 12/1985 Elliott
(Continued)

FOREIGN PATENT DOCUMENTS

EP 2315333 A2 4/2011
WO 2013071098 A1 5/2013

OTHER PUBLICATIONS

Information Disclosure Statement (IDS) Letter Regarding Common Patent Application(S), dated Dec. 18, 2023.

*Primary Examiner* — Pedro J Cuevas
(74) *Attorney, Agent, or Firm* — TILLMAN WRIGHT, PLLC; Chad D. Tillman; James D. Wright

(57) ABSTRACT

A medium voltage inrush current (MVIC) regulator and interconnection control system for interposing between a distributed power generation facility and a utility grid. The facility has a designated generator step-up (GSU) transformer and is connected to the utility grid at a point of interconnect. The system includes a pre-insertion impedance injection transformer, a low voltage first switch connected between the pre-insertion transformer and secondary coils of the designated GSU transformer, a medium voltage second switch connected inline between the pre-insertion transformer and primary coils of the designated GSU transformer, and a controller. In response to restoration of the utility grid following a loss-of-grid event, the controller opens and closes the first and second switches according to an automated pre-energization switching sequence such that magnetic flux in the designated GSU transformer occurs at a reduced rate, thereby reducing inrush of current and undesirable power quality phenomena.

20 Claims, 22 Drawing Sheets

Related U.S. Application Data

(60) Provisional application No. 63/208,775, filed on Jun. 9, 2021.

(51) Int. Cl.
*H02H 9/02* (2006.01)
*H02J 3/38* (2006.01)

(56) References Cited

U.S. PATENT DOCUMENTS

| | | |
|---|---|---|
| 4,695,741 A | 9/1987 | Takeda |
| 5,227,713 A | 7/1993 | Bowler et al. |
| 5,821,790 A | 10/1998 | Sweetman |
| 6,075,349 A | 6/2000 | Okayama |
| 7,990,743 B2 | 8/2011 | Walling et al. |
| 8,014,181 B2 | 9/2011 | Tan et al. |
| 8,816,535 B2 | 8/2014 | Adest et al. |
| 9,588,557 B2 | 3/2017 | Wilkins et al. |
| 9,960,600 B1 | 5/2018 | Shakeel et al. |
| 10,230,310 B2 | 3/2019 | Loewenstern et al. |
| 10,352,304 B2 | 7/2019 | Zabalza et al. |
| 10,389,125 B2 | 8/2019 | Wilkins et al. |
| 10,530,158 B2 | 1/2020 | Lee |
| 10,840,838 B2 | 11/2020 | Evans et al. |
| 10,886,737 B2 * | 1/2021 | Zietlow ............... H02J 3/46 |
| 11,017,967 B2 | 5/2021 | Montich |
| 11,286,903 B2 * | 3/2022 | Brogan ............... F03D 7/048 |
| 11,539,211 B2 | 12/2022 | Harrington |
| 11,831,271 B1 | 11/2023 | Foodman et al. |
| 12,100,962 B2 * | 9/2024 | Brogan ............... H02J 3/381 |
| 2010/0138061 A1 | 6/2010 | Walling et al. |
| 2013/0131878 A1 | 5/2013 | Wilkins et al. |
| 2015/0021298 A1 | 1/2015 | Sawada et al. |
| 2016/0333856 A1 | 11/2016 | Zabalza et al. |
| 2017/0214250 A1 * | 7/2017 | Zietlow ............... H02J 3/38 |
| 2018/0076622 A1 | 3/2018 | Wilkins et al. |
| 2019/0199256 A1 | 6/2019 | Evans et al. |
| 2020/0400120 A1 * | 12/2020 | Brogan ............... H02J 11/00 |
| 2020/0411260 A1 | 12/2020 | Montich |
| 2022/0231510 A1 * | 7/2022 | Brogan ............... H02J 3/388 |
| 2022/0337064 A1 * | 10/2022 | Briff ............... H02J 1/02 |

\* cited by examiner

US 12,166,450 B2

MEDIUM VOLTAGE INRUSH CURRENT REGULATION AND INTERCONNECTION CONTROL SYSTEM AND METHOD

CROSS-REFERENCE TO RELATED APPLICATION

The present application hereby incorporates by reference the disclosures of each of U.S. patent applications 63/208,775 and U.S. patent application Ser. No. 17/836,804, and U.S. Pat. No. 11,831,271.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present disclosure relates generally to the regulation of medium voltage inrush current and, more particularly, to methods for regulation of medium voltage inrush current and a system for interconnection control.

Background

Solar farms and other distributed power generation facilities have become widespread in recent years. Distributed generation systems interconnect at the electric utility's available distribution system voltage and utilize generator step-up (GSU) transformers to increase the AC voltages from DC-AC PV inverters to the electric utility distribution voltage level. Thus, the increasing penetration of utility scale distributed generators interconnecting to electric utility distribution feeders has resulted in a large number of GSU transformers supported by the utility distribution feeder. Such an arrangement is shown in FIG. 1, which is a schematic illustration of a GSU transformer connected to a utility grid at a point of interconnection (POI).

Voltage disturbances resulting from unmitigated inrush currents produced from energizing transformers interconnected to electric utility distribution systems pose operational challenges for both the interconnecting electric utility and the distributed generating facility. Depending on the size and quantity of GSU transformers at a distributed generation facility there may be very high levels of inrush current imposed on the electric utility's distribution feeder.

For example, following a loss-of-grid event, a facility's medium voltage equipment and loads are de-energized, as shown in FIG. 2. Upon grid restoration, the initial energization of the core-coil assembly of the facility's medium voltage equipment magnetizes, creating a short, but measurable, inrush of current flowing into the GSU primary windings. As represented in FIG. 3, this short-term demand causes a corresponding voltage drop on the interconnecting grid, leading to power quality phenomena that may be unacceptable to the interconnecting utility service provider. As the facility's medium voltage equipment is initially energized, however, the magnetic flux creates an inductive surge that then pushes back on the grid, creating a short, but measurable, voltage increase as the connected electrical system settles.

As the generating capacity of distributed generation facilities increases, a higher quantity or larger size of GSU transformers is required to supply the energy to the interconnected utility. The higher quantity or larger size of GSU transformers, in turn, results in an increased inrush current, which causes significant operational issues for the interconnected utility's distribution feeder. The utility feeder can experience voltage sags/spikes as well as rapid voltage change. These problems imposed on the utility distribution feeder can cause the utility to be out of compliance with state and federal power quality requirements. In addition, these issues are identified late during the utility study periods and may impose significant cost or operating restrictions to the distributed generation developer to mitigate the effects. These additional requirements may cause a distributed generation project to become economically infeasible to construct and operate.

Several approaches have been utilized to minimize magnetizing inrush currents, including energizing the transformer on a point of wave sensing for optimal closing to minimize inrush current, installing neutral grounding resistors between the GSU transformer and ground to reduce the transformer inrush current, installing series compensators to reduce the GSU transformer inrush current, and installing staggered or time delayed energization of GSU transformers when multiple transformers are installed within a distributed generation plant. Unfortunately, such methods often require significant additional engineering and facilities, and the designs of these systems have to be adapted to the GSU transformers in the distributed generation plant design and may not be available, or are cost prohibitive, for the project.

Thus, a need exists for improved methods and interconnection control systems for regulating medium voltage inrush current. One or more of the foregoing needs and/or other needs may be addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of photovoltaic power stations, the present invention is not limited to use only in photovoltaic power stations, as will become apparent from the following summaries and detailed descriptions of aspects, features, and one or more embodiments of the present invention.

Broadly defined, the present invention according to one aspect relates to a medium voltage inrush current (MVIC) regulator and interconnection control system for interposing between a distributed power generation facility, having a designated generator step-up (GSU) transformer, and a utility grid, the distributed power generation facility being connected to the utility grid at a point of interconnect, comprising: a pre-insertion impedance injection transformer; a first switch connected between the pre-insertion transformer and secondary coils of the designated GSU transformer, the first switch being a low voltage switch; a second switch connected inline between the pre-insertion transformer and primary coils of the designated GSU transformer, the second switch being a medium voltage switch; and a controller adapted, in response to restoration of the utility grid following a loss-of-grid event, to open and close the first and second switches according to an automated pre-energization switching sequence such that magnetic flux in the designated GSU transformer occurs at a reduced rate, thereby reducing inrush of current and undesirable power quality phenomena.

In a feature of this aspect, the distributed power generation facility is a photovoltaic power station.

In another feature of this aspect, the pre-insertion transformer has a higher impedance, a very low kVA size, and a significantly lower inrush current rating than the designated GSU transformer. In a further feature, the pre-insertion transformer is three-phase 600 V/3 kVA transformer.

In another feature of this aspect, the controller, in carrying out the automated pre-energization switching sequence, closes the low voltage switch, a first predetermined period of time after initial energization of the utility grid at the point of interconnect, to energize the secondary coil of the designated GSU transformer, then after a second predetermined period of time closes the medium voltage switch to cause the designated GSU transformer to be connected in parallel to the pre-insertion transformer to provide full distribution voltage to the designated GSU transformer, and then after a third predetermined period of time opens the low voltage switch to remove the pre-insertion transformer from the parallel circuit. In further features, the controller, in carrying out the automated pre-energization switching sequence, opens the first and second switches before the initial energization of the utility grid at the point of interconnect; the system further includes one or more metering relay, and execution of the automated pre-energization switching sequence is contingent upon input to the controller from the one or more metering relay; the system further includes one or more protective relay, and the execution of the automated pre-energization switching sequence is contingent upon input to the controller from the one or more protective relay; the system further includes an uninterruptible power supply and battery to provide power to the controller during the automated pre-energization switching sequence; execution of the automated pre-energization switching sequence is contingent upon input to the controller from the uninterruptible power supply and battery; the first predetermined period of time has a magnitude designed to ensure that the grid is stable and the designated GSU transformer and the elements of the system are available to operate; the first predetermined period of time is in the range of 3-15 seconds, inclusive; the first predetermined period of time is in the range of 5-10 seconds, inclusive; the second predetermined period of time has a magnitude designed to ensure that oscillation is reduced sufficiently relative to steady state; the second predetermined period of time is in the range of 5-15 seconds, inclusive; the second predetermined period of time is in the range of 10-12 seconds, inclusive; the magnitude is designed to ensure that oscillation is reduced to within 2% of steady state; the third predetermined period of time has a magnitude designed to ensure that the voltage grid is stable and the designated GSU transformer and the elements of the system are available to operate; the third predetermined period of time is in the range of 1-5 seconds, inclusive; the third predetermined period of time is in the range of 1.0-2.5 seconds, inclusive; one or more of the first, second, and third predetermined periods of time has a magnitude that is customized based on specific characteristics of the photovoltaic power station where the system is installed; and/or the system further includes a user interface that displays real-time status information during, and based upon, the automated pre-energization switching sequence.

In another feature of this aspect, the controller includes a programmable logic controller (PLC) programmed to execute the automated pre-energization switching sequence.

In another feature of this aspect, the system further includes realtime operator interface software communicatively connected to the controller via a wireless communication link, the realtime operator interface software providing a remote operator with the capability to adjust parameters and timing sequence settings without physically going on site. In further features, the realtime operator interface software further provides the remote operator with the ability to remotely issue a command to trigger the automated pre-energization switching sequence or to clear a trip event prior to initiating the automated pre-energization switching sequence.

In another feature of this aspect, the designated GSU transformer is one transformer out of a plurality of GSU transformers in the distributed power generation facility, the plurality of GSU transformers being chained together.

In another feature of this aspect, the system further includes a primary voltage cabinet that houses the pre-insertion impedance injection transformer, the first and second switches, the controller, and a user interface, and the primary voltage cabinet, the pre-insertion impedance injection transformer, the first and second switches, the controller, and the user interface are part of a self-contained assembly. In a further feature, the user interface is housed in a side compartment, of the primary voltage cabinet, that is separated from the rest of an interior of the primary voltage cabinet but is accessible by an exterior door.

Broadly defined, the present invention according to another aspect relates to a distributed power generation facility equipped with a medium voltage inrush current (MVIC) regulator and interconnection control system, including: one or more generator step-up (GSU) transformers, at least one of the one or more GSU transformers being a designated GSU transformer, the one or more GSU transformers being connected to a utility grid at a point of interconnect; and a MVIC regulator and interconnection control system interposed between the one or more GSU transformers and the utility grid point of interconnect, the system including a pre-insertion impedance injection transformer, a first switch connected between the pre-insertion transformer and secondary coils of the designated GSU transformer, the first switch being a low voltage switch, a second switch connected inline between the pre-insertion transformer and primary coils of the designated GSU transformer, the second switch being a medium voltage switch, and a controller adapted, in response to restoration of the utility grid following a loss-of-grid event, to open and close the first and second switches according to an automated pre-energization switching sequence such that magnetic flux in the designated GSU transformer occurs at a reduced rate, thereby reducing inrush of current and undesirable power quality phenomena.

In a feature of this aspect, the distributed power generation facility is a photovoltaic power station.

In another feature of this aspect, the pre-insertion transformer has a higher impedance, a very low kVA size, and a significantly lower inrush current rating than the designated GSU transformer. In a further feature, the pre-insertion transformer is three-phase 600 V/3 kVA transformer.

In another feature of this aspect, the controller, in carrying out the automated pre-energization switching sequence, closes the low voltage switch, a first predetermined period of time after initial energization of the utility grid at the point of interconnect, to energize the secondary coil of the designated GSU transformer, then after a second predetermined period of time closes the medium voltage switch to cause the designated GSU transformer to be connected in parallel to the pre-insertion transformer to provide full distribution voltage to the designated GSU transformer, and then after a third predetermined period of time opens the low voltage switch to remove the pre-insertion transformer from the parallel circuit. In further features, the controller, in carrying out the automated pre-energization switching sequence, opens the first and second switches before the initial energization of the utility grid at the point of interconnect; the MVIC regulator and interconnection control system further includes one or more metering relay, and execution of the automated pre-energization switching sequence is contingent upon input to the controller from the one or more metering relay; the MVIC regulator and interconnection control system further includes one or more protective relay, and execution of the automated pre-energization switching sequence is contingent upon input to the controller from the one or more protective relay; the MVIC regulator and interconnection control system further includes an uninterruptible power supply and battery to provide power to the controller during the automated pre-energization switching sequence; execution of the automated pre-energization switching sequence is contingent upon input to the controller from the uninterruptible power supply and battery; the first predetermined period of time has a magnitude designed to ensure that the grid is stable and the designated GSU transformer and the elements of the system are available to operate; the first predetermined period of time is in the range of 3-15 seconds, inclusive; the first predetermined period of time is in the range of 5-10 seconds, inclusive; the second predetermined period of time has a magnitude designed to ensure that oscillation is reduced sufficiently relative to steady state; the second predetermined period of time is in the range of 5-15 seconds, inclusive; the second predetermined period of time is in the range of 10-12 seconds, inclusive; the magnitude is designed to ensure that oscillation is reduced to within 2% of steady state; the third predetermined period of time has a magnitude designed to ensure that the voltage grid is stable and the designated GSU transformer and the elements of the system are available to operate; the third predetermined period of time is in the range of 1-5 seconds, inclusive; the third predetermined period of time is in the range of 1.0-2.5 seconds, inclusive; one or more of the first, second, and third predetermined periods of time has a magnitude that is customized based on specific characteristics of the photovoltaic power station where the system is installed; and/or the MVIC regulator and interconnection control system further includes a user interface that displays real-time status information during, and based upon, the automated pre-energization switching sequence.

In another feature of this aspect, the controller includes a programmable logic controller (PLC) programmed to execute the automated pre-energization switching sequence.

In another feature of this aspect, the facility further includes realtime operator interface software communicatively connected to the controller via a wireless communication link, the realtime operator interface software providing a remote operator with the capability to adjust parameters and timing sequence settings without physically going on site. In a further feature, the realtime operator interface software further provides the remote operator with the ability to remotely issue a command to trigger the automated pre-energization switching sequence or to clear a trip event prior to initiating the automated pre-energization switching sequence.

In another feature of this aspect, the designated GSU transformer is one transformer out of a plurality of GSU transformers in the distributed power generation facility, the plurality of GSU transformers being chained together.

In another feature of this aspect, the MVIC regulator and interconnection control system further includes a primary voltage cabinet that houses the pre-insertion impedance injection transformer, the first and second switches, the controller, and a user interface, and the primary voltage cabinet, the pre-insertion impedance injection transformer, the first and second switches, the controller, and the user interface are part of a self-contained assembly. In a further feature, the user interface is housed in a side compartment, of the primary voltage cabinet, that is separated from the rest of an interior of the primary voltage cabinet but is accessible by an exterior door.

Broadly defined, the present invention according to another aspect relates to a method of reducing inrush current using a medium voltage inrush current (MVIC) regulator and interconnection control system interposed between a distributed power generation facility, having a designated generator step-up (GSU) transformer, and a utility grid, the distributed power generation facility being connected to the utility grid at a point of interconnect, the MVIC regulator and interconnection control system having a pre-insertion impedance injection transformer, a low voltage first switch connected between the pre-insertion transformer and secondary coils of the designated GSU transformer, a medium voltage second switch connected inline between the pre-insertion transformer and primary coils of the designated GSU transformer, and a controller, the method including the steps of: following a loss-of-grid event, ensuring that the first and second switches are open; and via the controller, and in response to restoration of the utility grid following the loss-of-grid event, opening and closing the first and second switches according to an automated pre-energization switching sequence such that magnetic flux in the designated GSU transformer occurs at a reduced rate, thereby reducing inrush of current and undesirable power quality phenomena.

In a feature of this aspect, the controller carries out the automated pre-energization switching sequence by: closing the low voltage switch, starting at a first predetermined period of time after initial energization of the utility grid at the point of interconnect, to energize the secondary coil of the designated GSU transformer; then, after a second predetermined period of time, closing the medium voltage switch to cause the designated GSU transformer to be connected in parallel to the pre-insertion transformer to provide full distribution voltage to the designated GSU transformer; and then, after a third predetermined period of time, opening the low voltage switch to remove the pre-insertion transformer from the parallel circuit. In further features, ensuring that the first and second switches are open includes, via the controller, opening the first and second switches before the initial energization of the utility grid at the point of interconnect; the MVIC regulator and interconnection control system includes one or more metering relay, and execution of the automated pre-energization switching sequence is contingent upon input received by the controller from the one or more metering relay; the MVIC regulator and interconnection control system includes one or more protective relay, and execution of the automated pre-energization switching sequence is contingent upon input received by the controller from the one or more protective relay; the MVIC regulator and interconnection control system includes an uninterruptible power supply and a battery, and the controller carries out the automated pre-energization switching sequence using power provided by the uninterruptible power supply and battery; execution of the automated pre-energization switching sequence is contingent upon input received by the controller from the uninterruptible power supply and battery; the first predetermined period of time has a magnitude designed to ensure that the grid is stable and the designated GSU transformer and the elements of the system are available to operate; the first predetermined period of time is in the range of 3-15 seconds, inclusive; the first predetermined period of time is in the range of 5-10 seconds, inclusive; the second predetermined period of time has a magnitude designed to ensure that oscillation is reduced sufficiently relative to steady state; the second predetermined period of time is in the range of 5-15 seconds, inclusive; the second predetermined period of time is in the range of 10-12 seconds, inclusive; the magnitude is designed to ensure that oscillation is reduced to within 2% of steady state; the third predetermined period of time has a magnitude designed to ensure that the voltage grid is stable and the designated GSU transformer and the elements of the system are available to operate; the third predetermined period of time is in the range of 1-5 seconds, inclusive; the third predetermined period of time is in the range of 1.0-2.5 seconds, inclusive; the method further includes a step of customizing a magnitude of one or more of the first, second, and third predetermined periods of time based on specific characteristics of the photovoltaic power station where the system is installed; and/or the method further includes a step of displaying, via a user interface, real-time status information during, and based upon, the automated pre-energization switching sequence.

In another feature of this aspect, the controller opens and closes the first and second switches according to the automated pre-energization switching sequence via a programmable logic controller (PLC) programmed to execute the automated pre-energization switching sequence.

In another feature of this aspect, the method further includes the steps of: via the controller, communicating, via a wireless communication link, with realtime operator interface software; and providing, via the realtime operator interface software, a remote operator with the capability to adjust parameters and timing sequence settings without physically going on site. In a further feature, providing a remote operator with the capability to adjust parameters and timing sequence settings without physically going on site includes providing the remote operator with the ability to remotely issue a command to trigger the automated pre-energization switching sequence or to clear a trip event prior to initiating the automated pre-energization switching sequence.

In another feature of this aspect, the designated GSU transformer is one transformer out of a plurality of GSU transformers that are chained together in the distributed power generation facility, and the method further includes the step of reducing inrush current to the chained GSU transformers using the medium voltage inrush current (MVIC) regulator and interconnection control system and the automated pre-energization switching sequence.

In another feature of this aspect, the method further includes a step of housing the pre-insertion impedance injection transformer, the first and second switches, the controller, and a user interface in a primary voltage cabinet, and the pre-insertion impedance injection transformer, the first and second switches, the controller, and the user interface are part of a self-contained assembly. In a further feature, the method further includes a step of housing the user interface is housed in a side compartment, of the primary voltage cabinet, that is separated from the rest of an interior of the primary voltage cabinet but is accessible by an exterior door.

In another feature of this aspect, the method further includes a step of installing the MVIC regulator and interconnection control system at a distributed power generation facility that is a photovoltaic power station. In further features, the pre-insertion transformer has a higher impedance, a very low kVA size, and a significantly lower inrush current rating than the designated GSU transformer; and/or the pre-insertion transformer is three-phase 600 V/3 kVA transformer Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
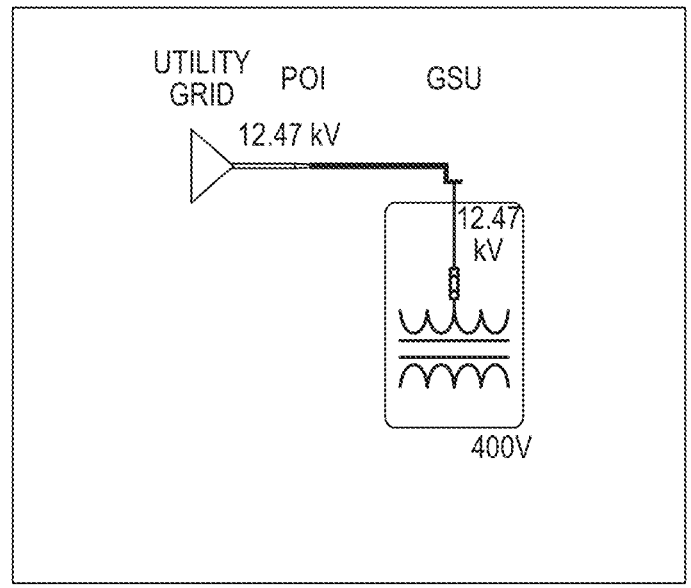
FIG. 1 is a schematic illustration of a GSU transformer connected to a utility grid at a point of interconnection (POI)
Figure 2:
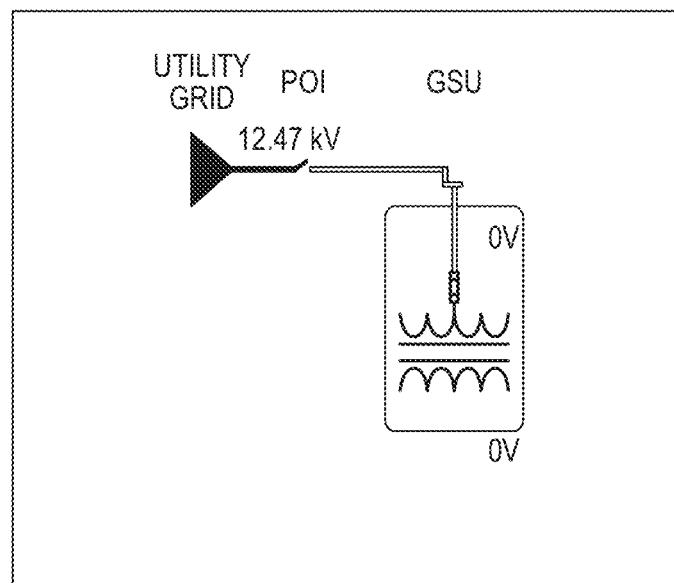
FIGS. 2 and 3 are schematic illustrations of the GSU and utility grid of FIG. 1 shown during a loss of grid condition and a grid restoration condition, respectively.
Figure 3:
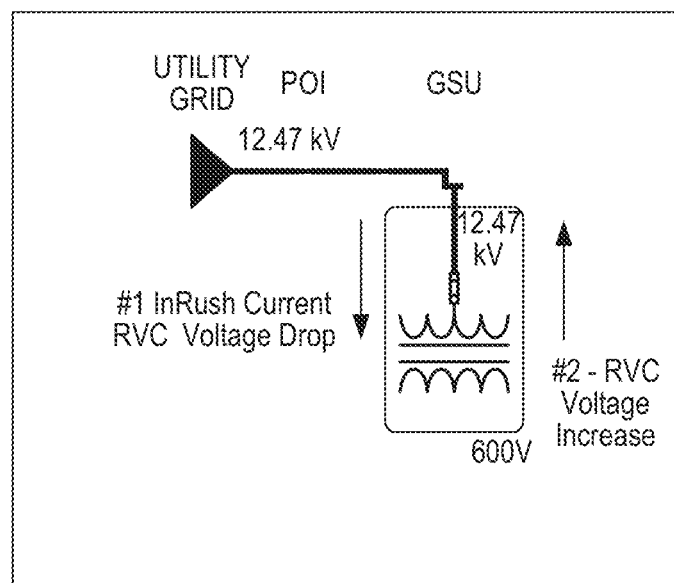

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 4:
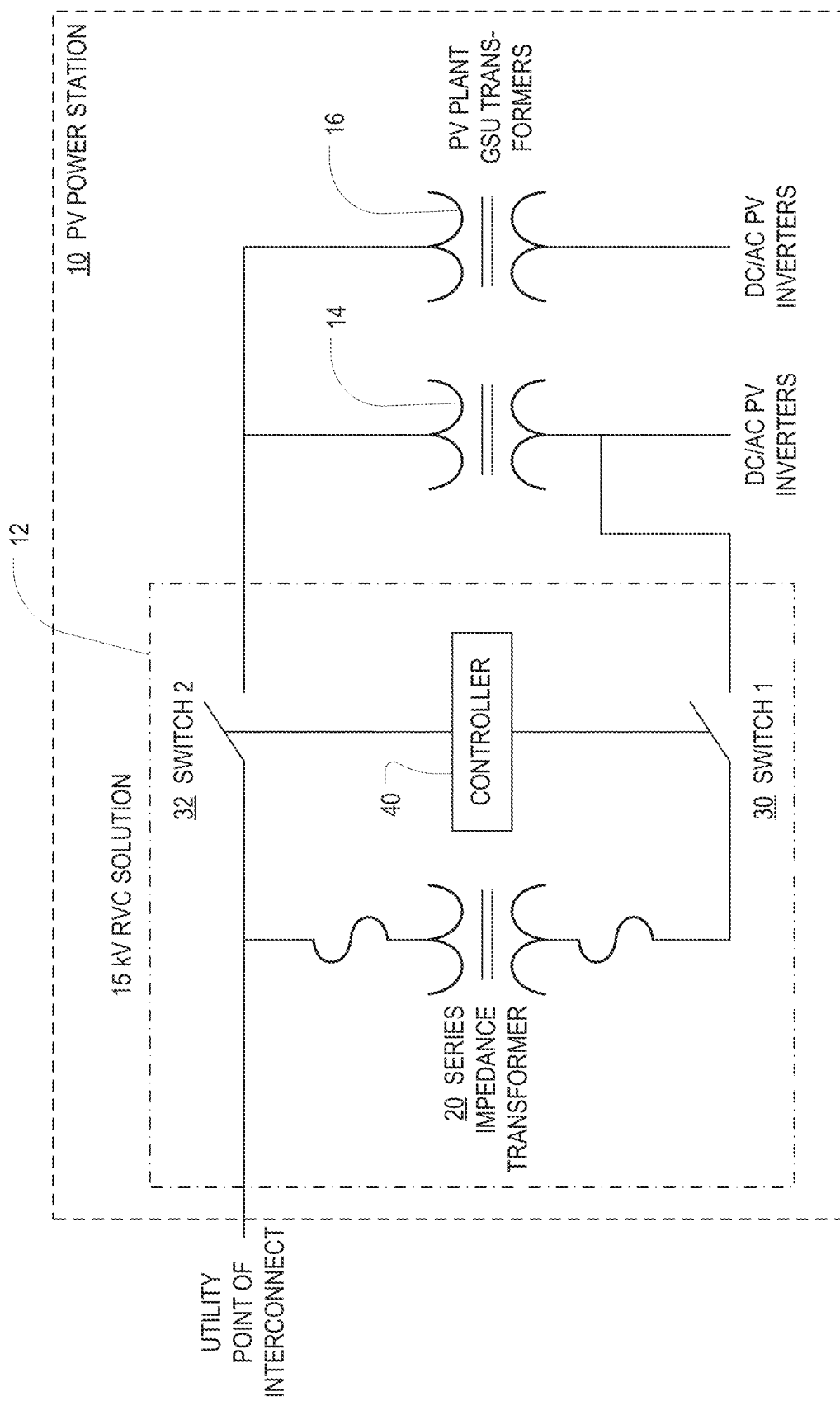
FIG. 4 is a circuit diagram illustrating a medium voltage inrush current (MVIC) regulator and interconnection control system connected inline between a GSU transformer of a photovoltaic power station and its point of interconnection to the utility grid in accordance with one or more preferred embodiments of the present invention.

FIG. 4 is a circuit diagram illustrating a medium voltage inrush current (MVIC) regulator and interconnection control system 12 connected inline between a GSU transformer 14 of a photovoltaic power station 10 and its point of interconnection to the utility grid in accordance with one or more preferred embodiments of the present invention. (Although illustrated as a PV power station, it will be apparent that other types of distributed power generation facilities may be substituted therefor.) In various embodiments, the medium voltage inrush current (MVIC) regulator and interconnection control system 12 may be used when a fully automated switching sequence is desired to mitigate the effects of current inrush and corresponding rapid voltage change due to the magnetization of connected medium voltage devices and loads during grid restoration or initial energization.

As shown in FIG. 4, the MVIC control system 12 includes a pre-insertion impedance injection transformer 20, a pair of switches 30,32, and a controller 40. The first switch 30 is a low voltage (LV) switch and is connected between the pre-insertion transformer 20 and the secondary coils of the designated GSU transformer 14. The second switch 32 is a medium voltage (MV) switch and is connected inline to the primary coils of the designated GSU transformer 14. As is generally conventional, the other GSU transformers 16 are chained to the designated GSU transformer 14. Operation of the switches 30,32 is under the control of the controller 40, which in at least some embodiments is a programmable logic controller (a small, dedicated computer sometimes referred to herein as a "PLC"). In at least one exemplary embodiment, the pre-insertion transformer 20 is a three-phase 600 V/3 kVA transformer.

General operation of the apparatus and system may be described as follows. To control the inrush current and the corresponding rapid voltage change upon grid restoration, the pre-insertion transformer 20 restricts the current flow during initial magnetization of downstream electrical loads. This current flow is directed through the pre-insertion transformer 20 to the secondary voltage side of the facility's designated GSU transformer 14 in the medium voltage chain of GSU transformers 16, with the remaining medium voltage transformers 16 in the chain being energized using the medium voltage loop feed which already exists in the facility. This is accomplished by programming the PLC 40 to execute a time-sequenced open and close switching operation with the LV and MV switches 30,32, sometimes referred to as a pre-energization switching sequence. The pre-energization timing sequence is programmed to prolong the total magnetization time to induce the magnetic flux over a wider window by building up primary voltage through the first transformer as a result of energization through the secondary connections, which in turn induces magnetic flux on other transformers in the facility's medium voltage equipment chain at the same reduced rate as the first transformer's primary magnetization. This reduces the inrush of current.

Figure 5:
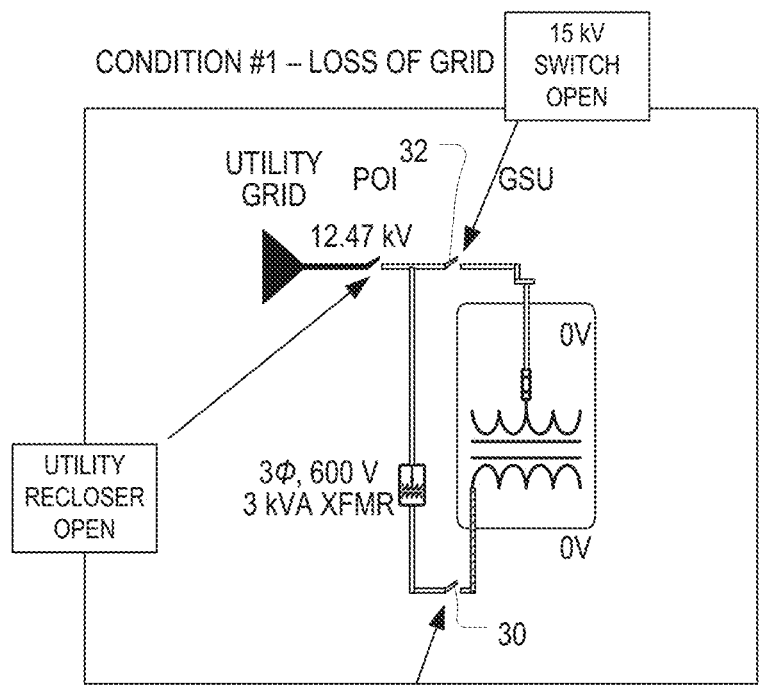
FIGS. 5-7, which are simplified circuit diagrams illustrating the general principle of operation of the apparatus shown in FIG. 4.
Figure 6:
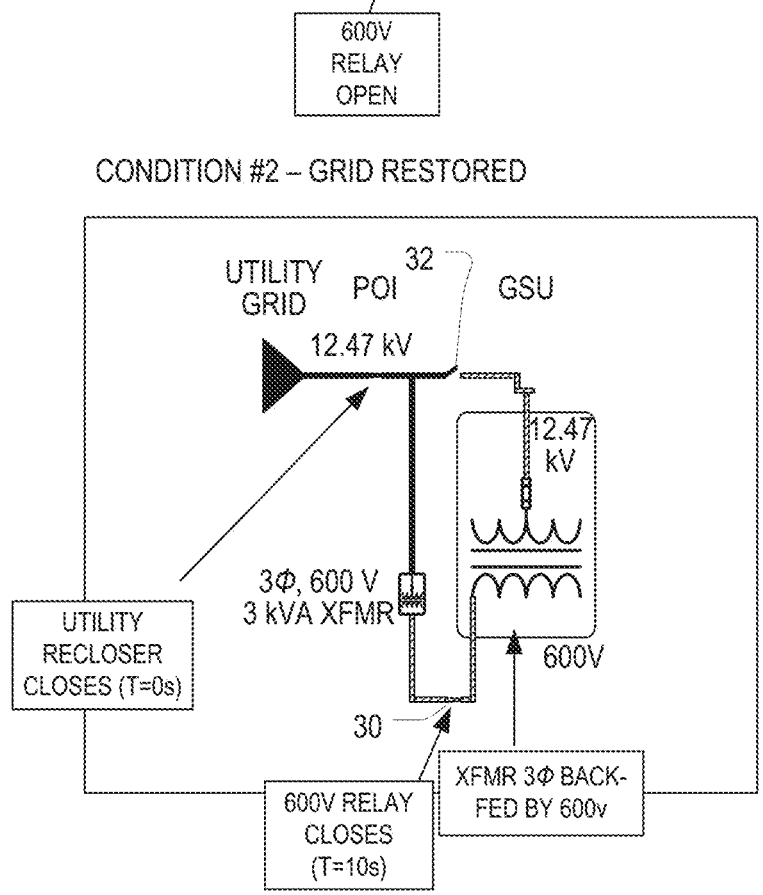
Figure 7:
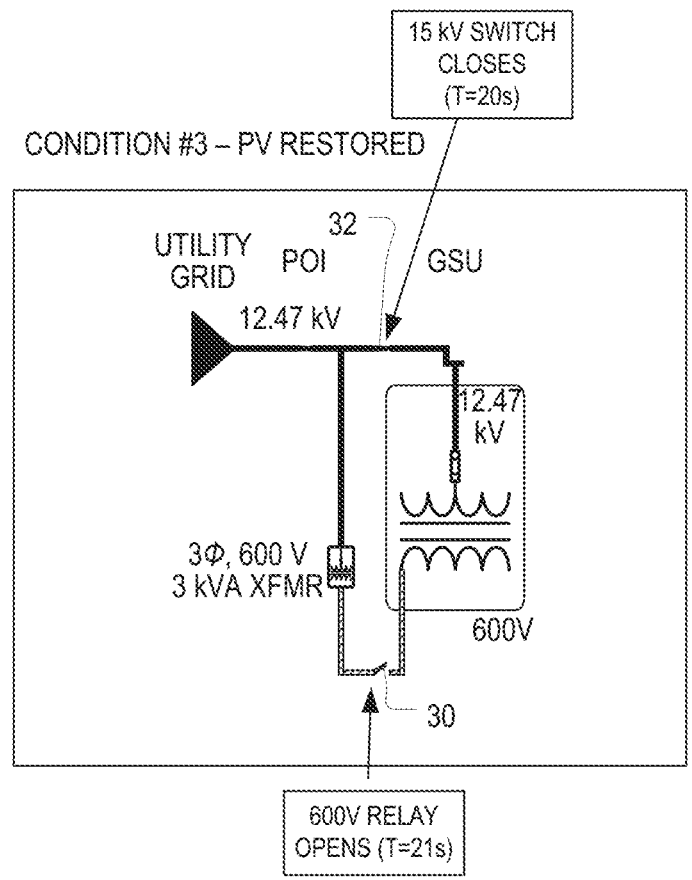

In simplified form, this pre-energization switching sequence may be understood with reference to FIGS. 5-7, which are simplified circuit diagrams illustrating the general principle of operation of the apparatus shown in FIG. 4. Prior to initial energization, both the LV switch 30 and the MV switch 32 are open and the distributed generation plant distribution is de-energized, as shown in FIG. 5. After the utility point of interconnection is energized, the LV switch 30 closes, as shown in FIG. 6. This action energizes the secondary coil of the attached GSU transformer 14 and in turn energizes the remainder of the distributed generation plant distribution system and any additional GSU transformers 16. The smaller series impedance transformer 20 has a higher impedance and a very low kVA size and has a significantly lower inrush current rating than the (larger) GSU transformer 14. After a pre-determined period of time, the MV switch 32 is closed to cause both the main GSU transformer 14 and the series impedance transformer 20 to be connected in parallel. This action provides full distribution voltage to the main GSU transformer 14. Then, after an additional pre-determined timing period, the LV switch 30 is opened, as shown in FIG. 7, thereby removing the series impedance transformer 20 from the parallel circuit and allowing all of the GSU transformers 14,16 in the distributed generation plant to be interconnected as intended.

Interconnecting the series impedance transformer 20 in this manner has several effects. First, the GSU inrush current is significantly reduced by the primary to secondary impedance of the series impedance transformer 20. In addition, the inrush current of the GSU transformer 14 is reduced because the energization of the core-coil assembly is from the secondary side and not the primary side of the transformer 14. Furthermore, the energization inrush current of any additional GSU transformers 16 connected in parallel to the first GSU transformer 14 is limited by both the impedance of the series impedance transformer 20 and the impedance of the first GSU transformer 14. By energizing the secondary coil with a series impedance in series with the secondary to primary impedance of the transformer the impedance "seen" by the system is significantly less that would have been "seen" by energizing the primary coil of the transformer.

Figure 8:
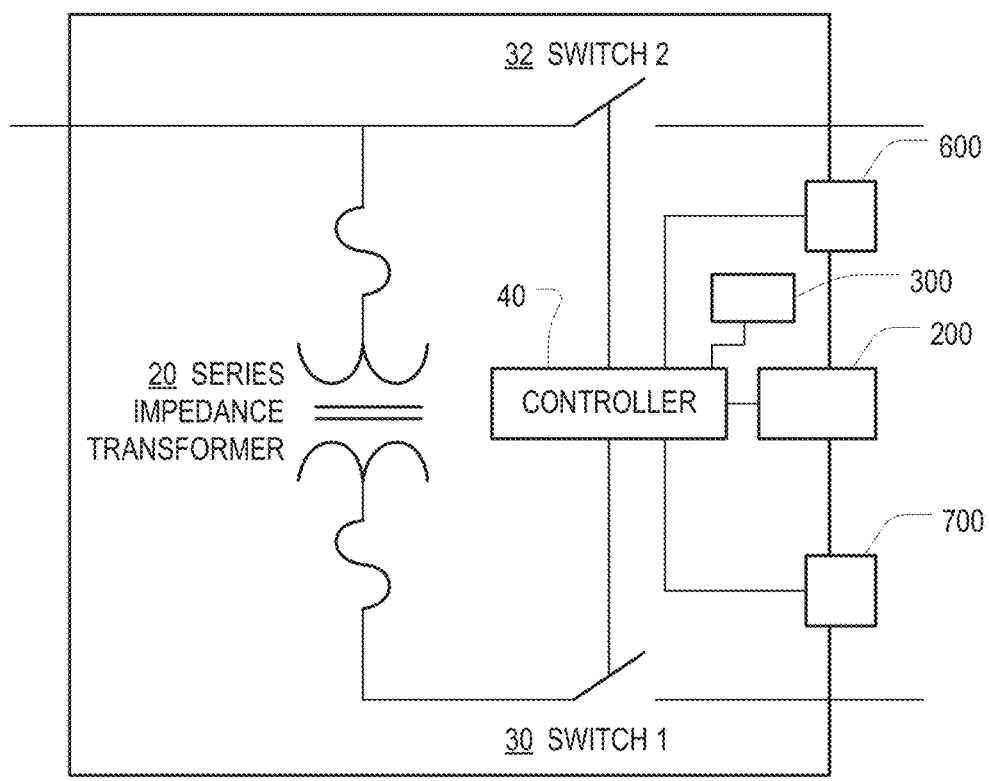
FIG. 8 is a simple diagram illustrating elements of the MVIC control system of FIG. 4.
Figure 9:
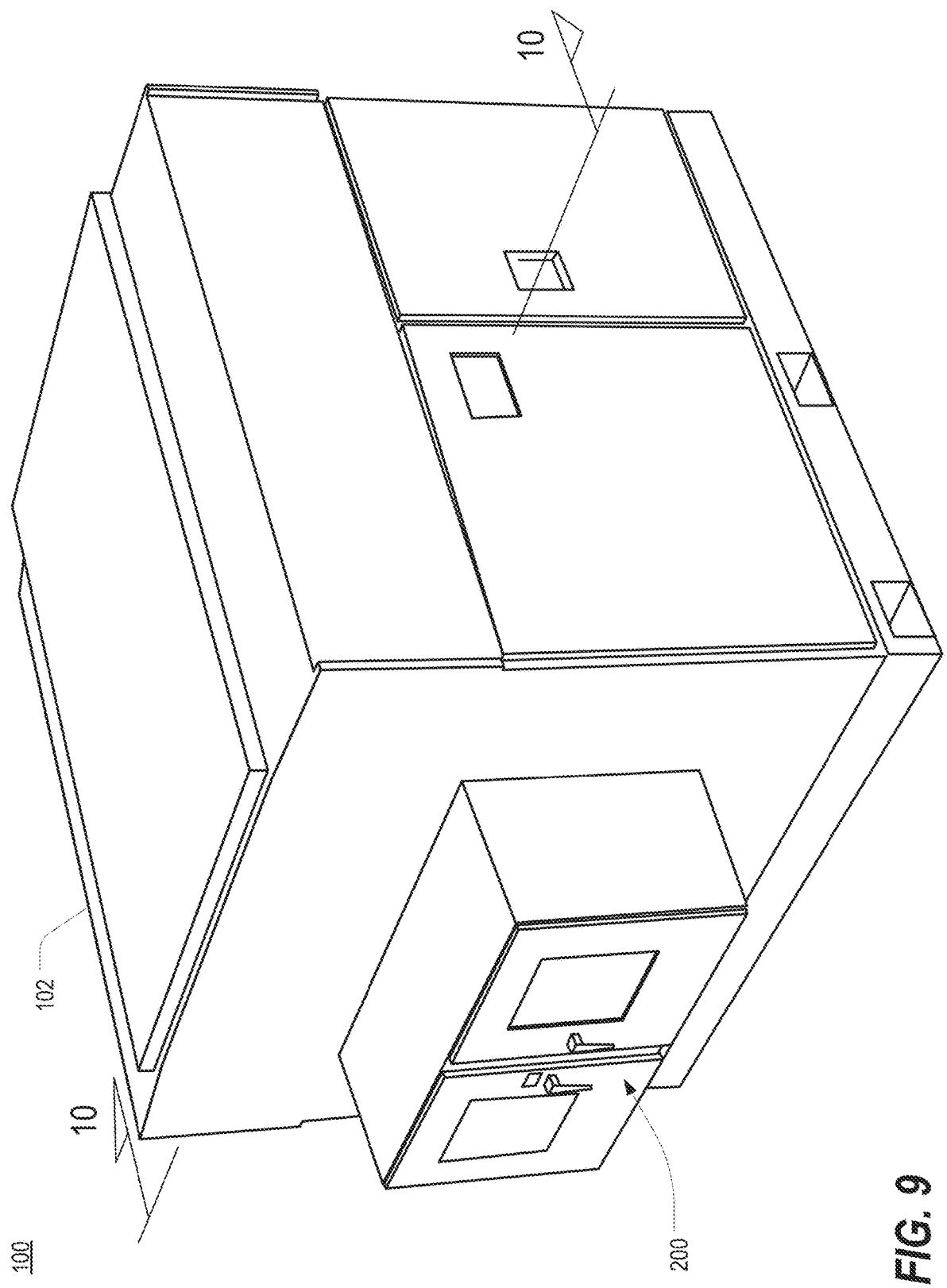
FIG. 9 is a perspective view of a self-contained assembly integrating the MVIC control system of FIG. 8, in accordance with one or more preferred embodiments of the present invention.

FIG. 8 is a simple diagram illustrating elements of the MVIC control system 12 of FIG. 4. As shown therein, the MVIC control system preferably includes the PLC 40, the pre-insertion transformer 20, the low voltage (LV) switch 30, the medium voltage (MV) switch 32, a user interface 200, real-time operator interface software 300, a revenue grade meter 600, and a protection relay 700. In at least some embodiments, all of these components may be integrated into a self-contained assembly for delivery, pre-wired, pre-programmed, and installed in line between the point of electrical interconnection and the facility's MV equipment. In this regard, FIG. 9 is a perspective view of a self-contained assembly 100 integrating the MVIC control system 12 of FIG. 8, in accordance with one or more preferred embodiments of the present invention. The self-contained assembly 100 includes a primary voltage cabinet 102 that houses the various operational components but makes the user interface 200 readily available to an operator. For example, in the illustrated embodiment, the user interface 200 is housed in a side compartment that is separated from the rest of the interior of the primary voltage cabinet 102 but is accessible by an exterior door.

Figure 10:
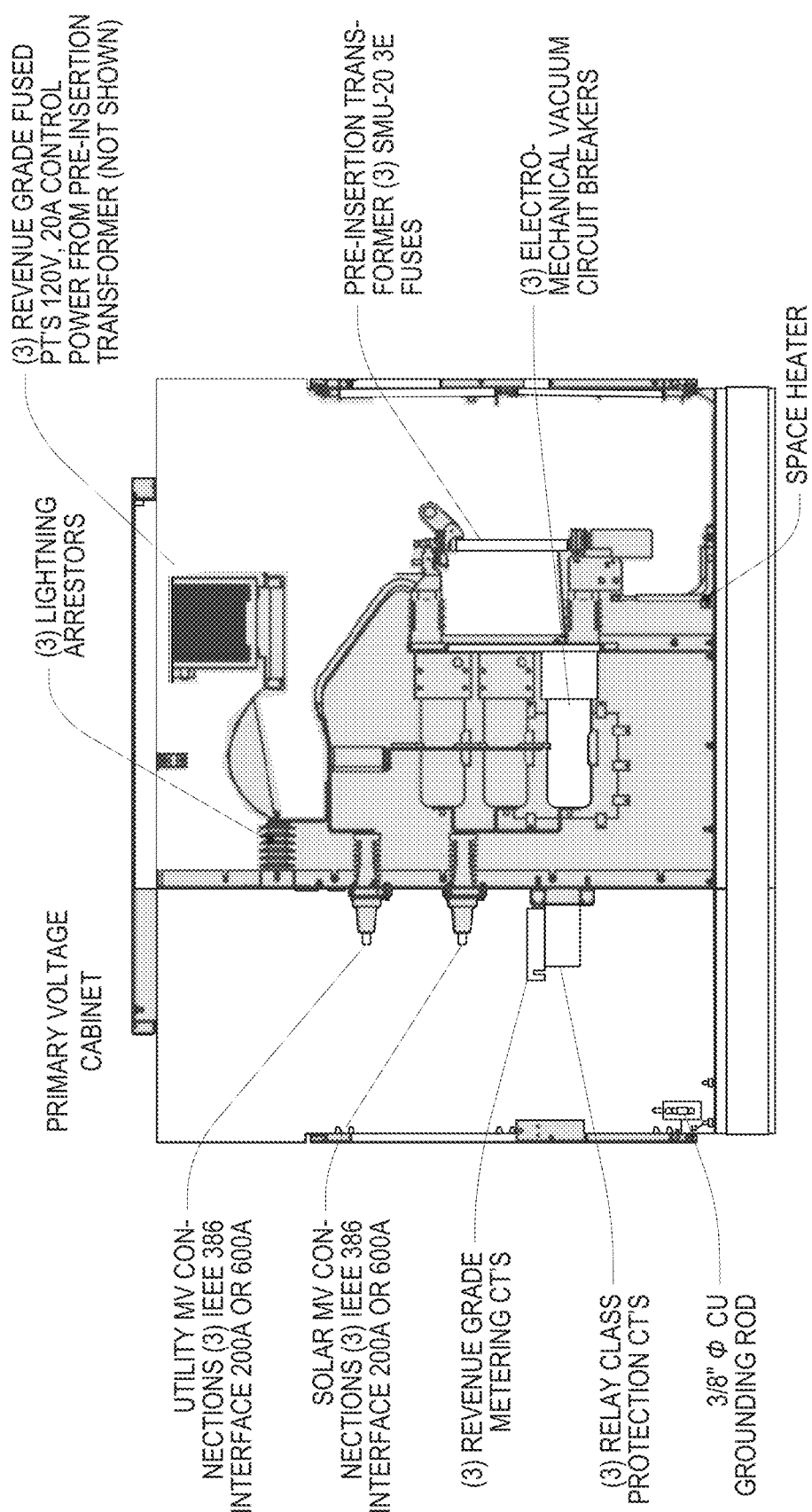
FIG. 10 is a cross-sectional view of the primary voltage cabinet of FIG. 9, taken along line 10-10.

Many of the operational components are illustrated in FIG. 10, which is a cross-sectional view of the primary voltage cabinet 102 of FIG. 9, taken along line 10-10. As shown therein, three utility MV connections and three distributed solar generation facility MV connections are provided (IEEE 386 interface, 200 A or 600 A) in one compartment of the cabinet 102. Three revenue grade metering current transformers (CTs) and three relay class protection current transformers (CTs) are likewise provided therein. The CTs step down the interconnection current flow to a range that the meter's inputs can also accept (typically a nominal 5 A). The revenue grade CTs are specified to provide high accuracy measurements throughout the high, mid, and low range of expected current flow to ensure proper power readings. The protection CTs are specified to provide operation on the higher end of expected current flow to accurately capture (over current) fault events.

In another compartment of the cabinet 102, three revenue grade fused potential transformers (PTs) (120V, 20 A) control power from the pre-insertion transformer 20 (not visible in FIG. 10) and are protected by three pre-insertion transformer fuses (SMU-20 3E). The PTs, which are shared for metering and protection relaying functions, step down the interconnection voltage to a range that the meter's inputs can accept (typically a nominal 120V). Protection is also provided by three electro-mechanical vacuum circuit breakers and three lightning arrestors. Other features may include a grounding rod (⅜-inch diameter CU) and a space heater. Although not illustrated, control operations during a loss-of-grid event are powered by a UPS and sealed lead-acid battery to provide 100% control panel device power backup. Other components may be described herein or may be apparent to one of ordinary skill in the art.

The PLC 40 is pre-programmed and shipped with the proper specifications to control and communicate with the onsite equipment for the purpose of ensuring the proper opening and closing timing sequence. The controller 40 pushes forward with the sequence unless any specified parameters defined in the program determine otherwise. Then the programming dictates the PLC 40 to send a 'fault' message to stop the pre-energization sequence from continuing.

More particularly, the time-sequenced open and close switching operation performed by the programmed PLC 40 is preferably accomplished by communicating with, and reading the input from, the metering and protective relays, data and pre-defined alarms from the power supply and battery back-up. The PLC 40 preferably assesses the information and verifies normal open and close contact positions to confirm the interconnecting grid has been restored and that the pre-energization switching sequence is operating in the expected manner. If the PLC 40 cannot validate that the components are working properly, or if the protection relay detects a fault condition, the PLC programming preferably makes a determination to send a system 'fault' message and takes action to signal the switch to cease the pre-energization sequence and restore to a safe state. If proper function is detected, the PLC 40 allows the switch to remain open such that the inrush current and rapid voltage change equalize electrically before the main medium voltage chain is directly reconnected to the interconnecting grid. The PLC 40 determines the equalization of the electricity through a programed timing sequence and by communicating with the recloser, and low voltage contactors. This interconnection operation with automatic 'fault' detection provides an additional safeguard protecting equipment and the grid from damage and technicians from injury during the pre-energization process through communication with the low voltage contactors, the power supply, the uninterruptable power supply, and the recloser.

The realtime operator interface software 300 preferably integrates the status and diagnostic information from both the PLC controller 40 and the relays in order to provide monitoring from off site and to communicate alarms via email or other means. Offsite communication may, in at least some embodiments, be provided via 10/100BasedT(X) Fast Ethernet Switch Built In— MODBUS TCP/IP, MODBUS RTU, DNP3 Supported. The software 300 preferably also provides the capability for an operator to adjust parameters and timing sequence settings without physically going on site, and preferably enables the operator to remotely issue a command to trigger the close operation or to clear a trip event prior to initiating a closing timing sequence as described.

An example of a method for regulating inrush current using a MVIC control system 12 is next described. One example of a sequence based on the custom program in the PLC computer is as follows. The sequence starts when the utility recloser closes (T=0 seconds). A first predetermined delay (in at least some embodiments, a delay of between 3-15 seconds, inclusive, and preferably of between 5-10 seconds, inclusive) occurs before further action in order to ensure or validate that the grid is stable and the equipment is available to operate. After that delay, the LV switch 30 is closed, inducing voltage on the secondary side of the first GSU transformer 14. A second predetermined delay (in at least some embodiments, a delay of between 5-15 seconds, inclusive, and preferably of about 10 seconds in order to bring oscillation within 2% of steady state) then occurs in order to reduce oscillation sufficiently. After that delay, the MV switch 32 is closed and the GSU 14 is energized on both the primary and secondary side thereof in parallel. A third predetermined delay (in at least some embodiments, a delay of between 1-5 seconds, inclusive, and preferably between 1.0-2.5 seconds, inclusive) occurs in order for the medium voltage to settle to stable levels. After that delay, the LV switch 30 is opened, and the medium voltage loop feed is connected directly to the grid.

It will be appreciated that the specific delay amounts may be dependent on various factors, including site characteristics, specific settling thresholds (to greater or less than within 2% of steady state, for example), and the like. These timing parameters are preferably configured as needed in the programming of the PLC 40.

Figure 11:
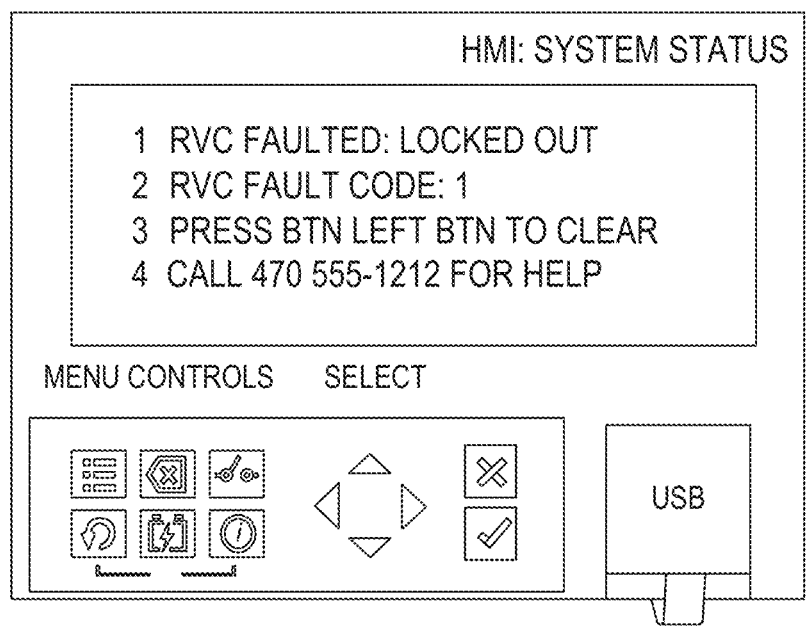
FIG. 11 is a front view of a portion of the user interface of FIG. 8 indicating a fault event.

During this sequence, device feedback is preferably communicated to the PLC 40 whereas the programming is used to determine whether or not the components are working. If proper low voltage operation and levels are not detected by the PLC, the system will communicate a 'fault' message not allowing the MV Switch to close (LV switch used normal open and normal closed contacts to verify that the preenergization stage is started). In this regard, FIG. 11 is a front view of a portion of the user interface 200 of FIG. 8 indicating a fault event.

Figure 12:
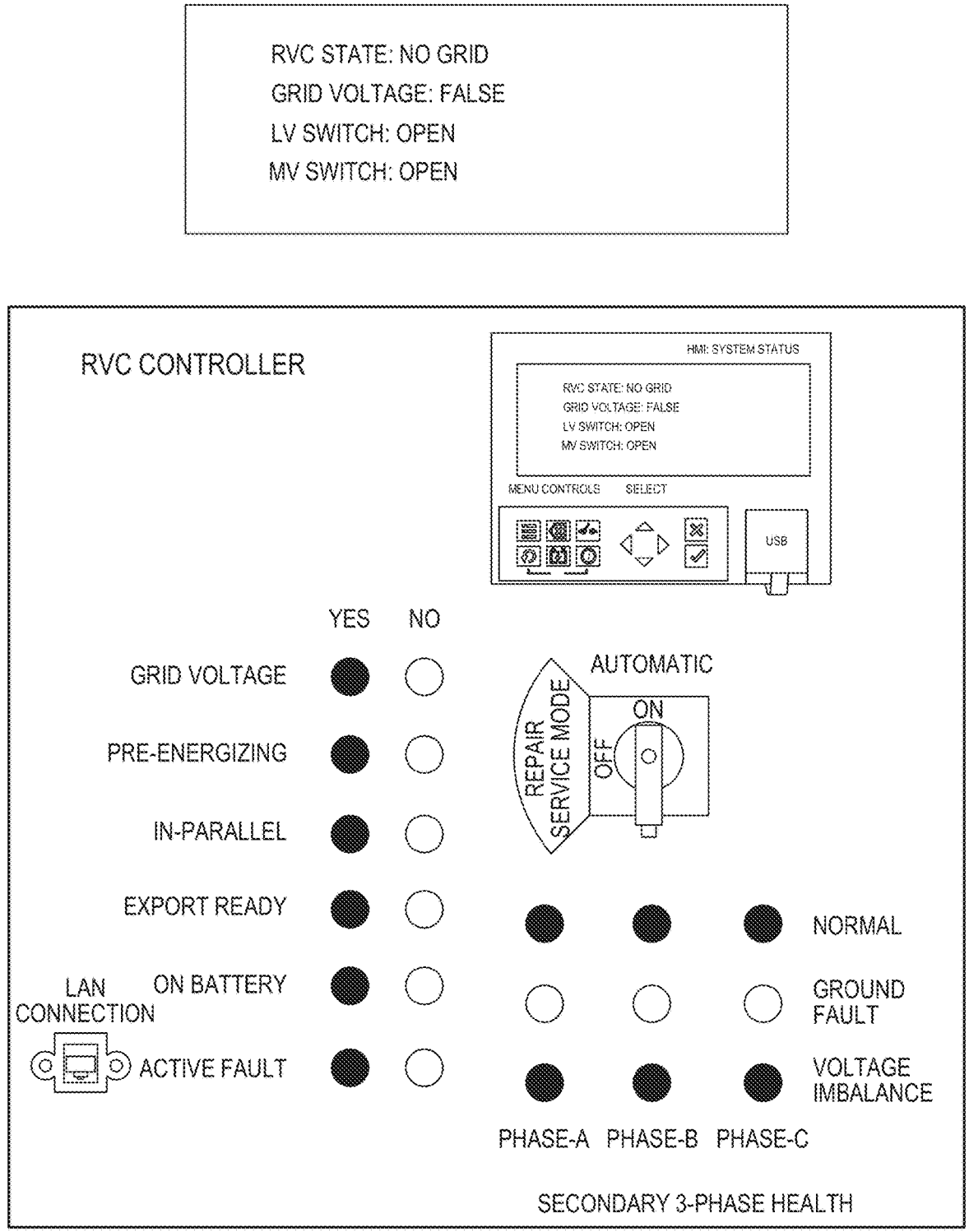
FIGS. 12-16, which are front views of the operator interface of FIG. 8 during stages of a recloser event.
Figure 13:
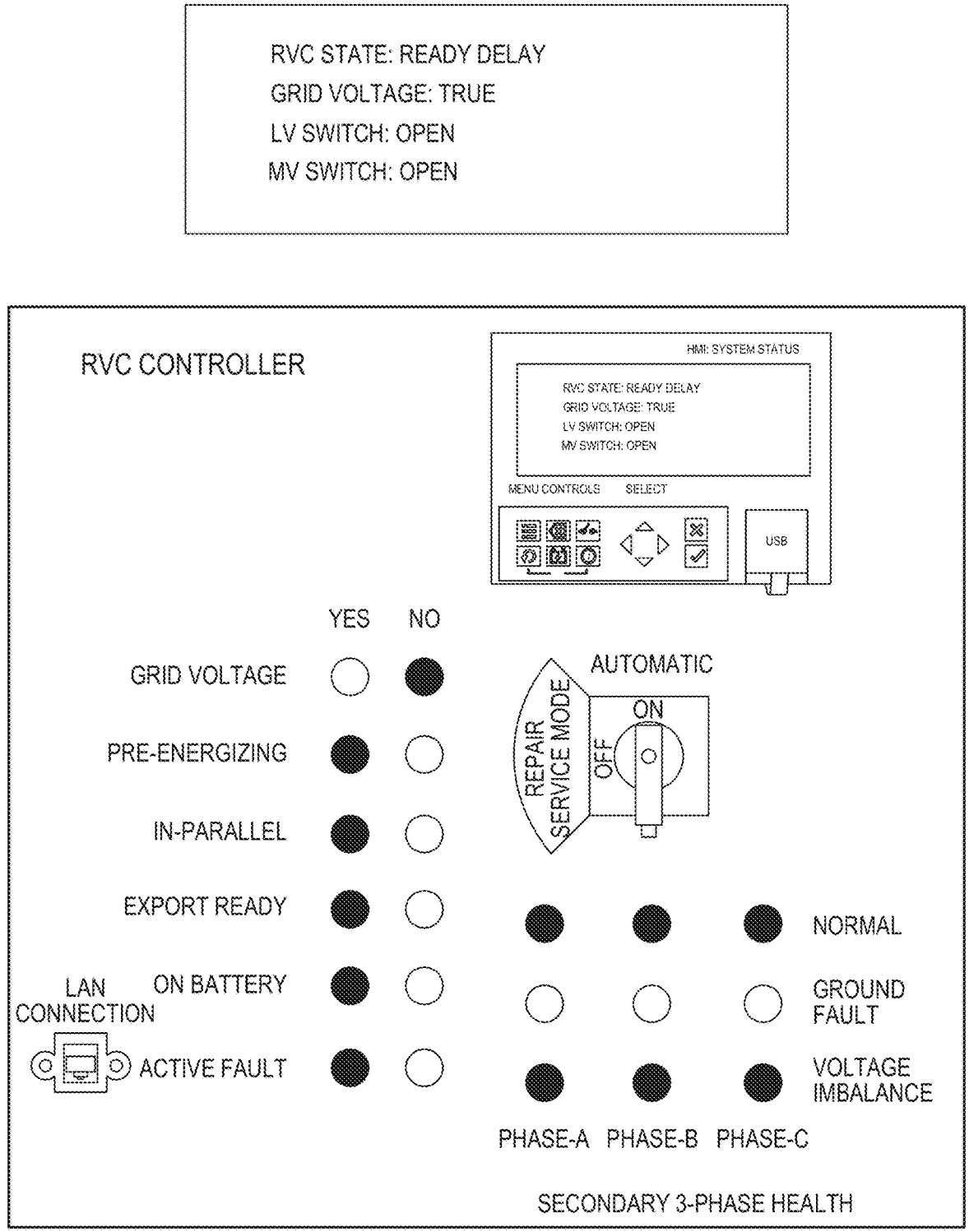
Figure 14:
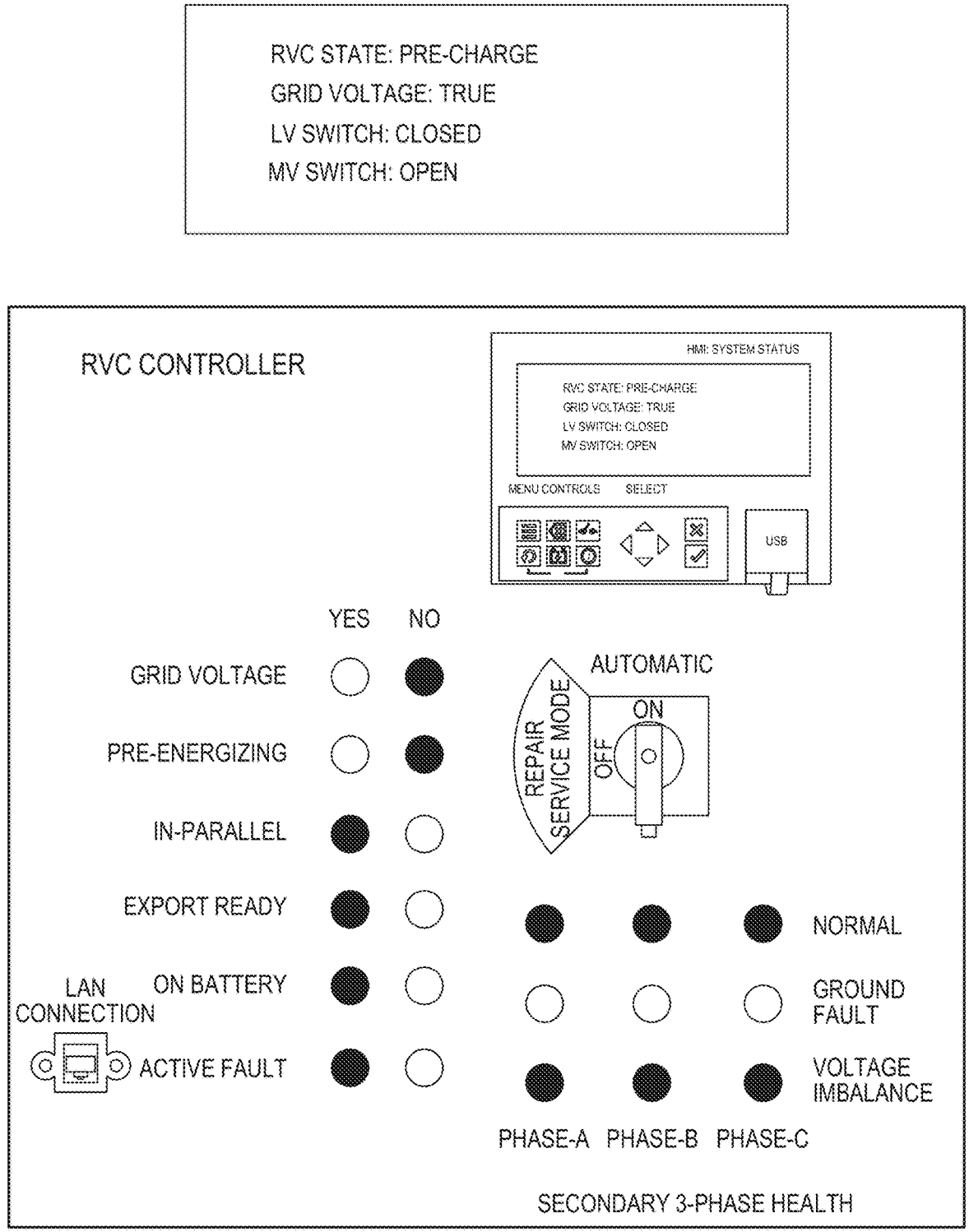
Figure 15:
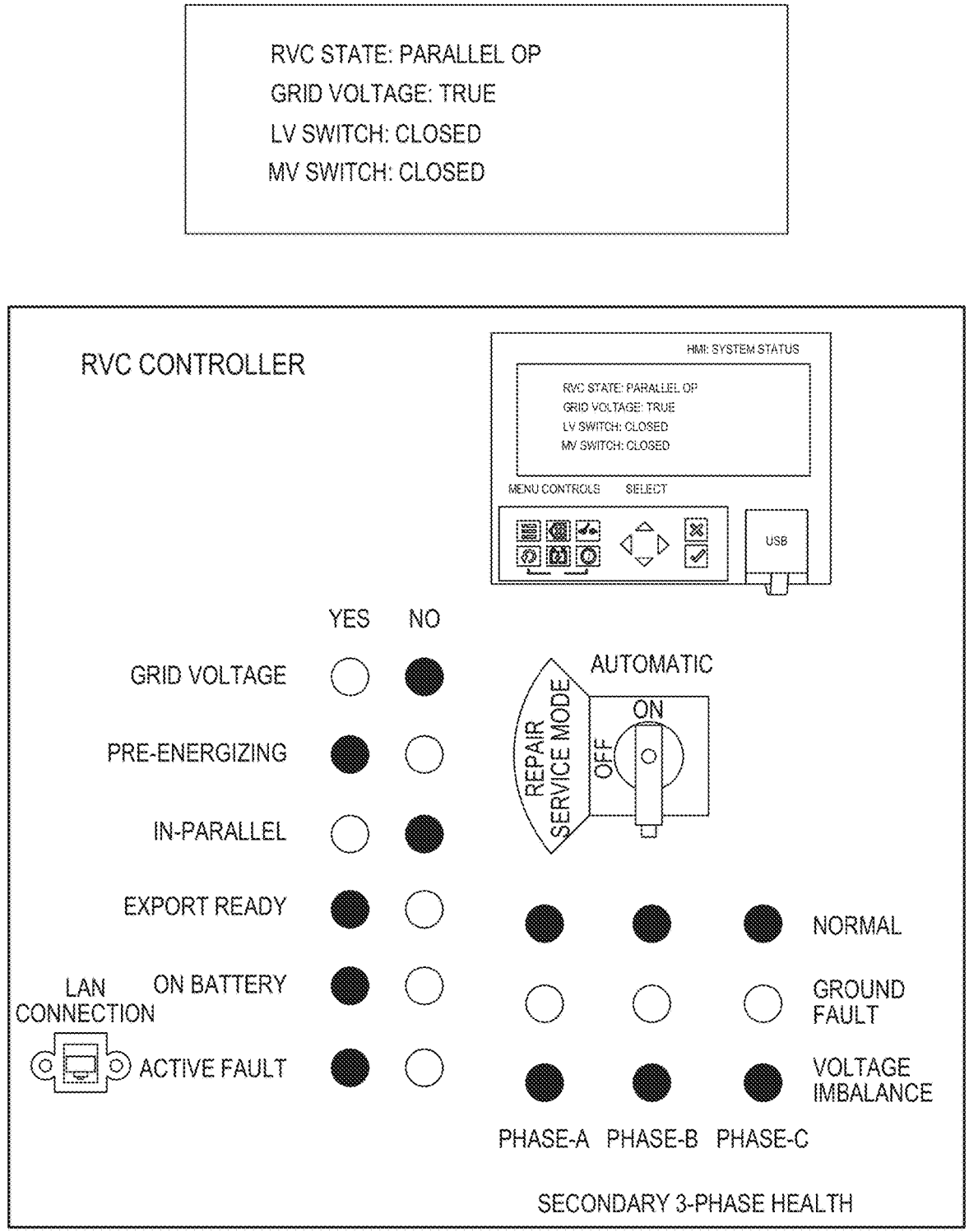
Figure 16:
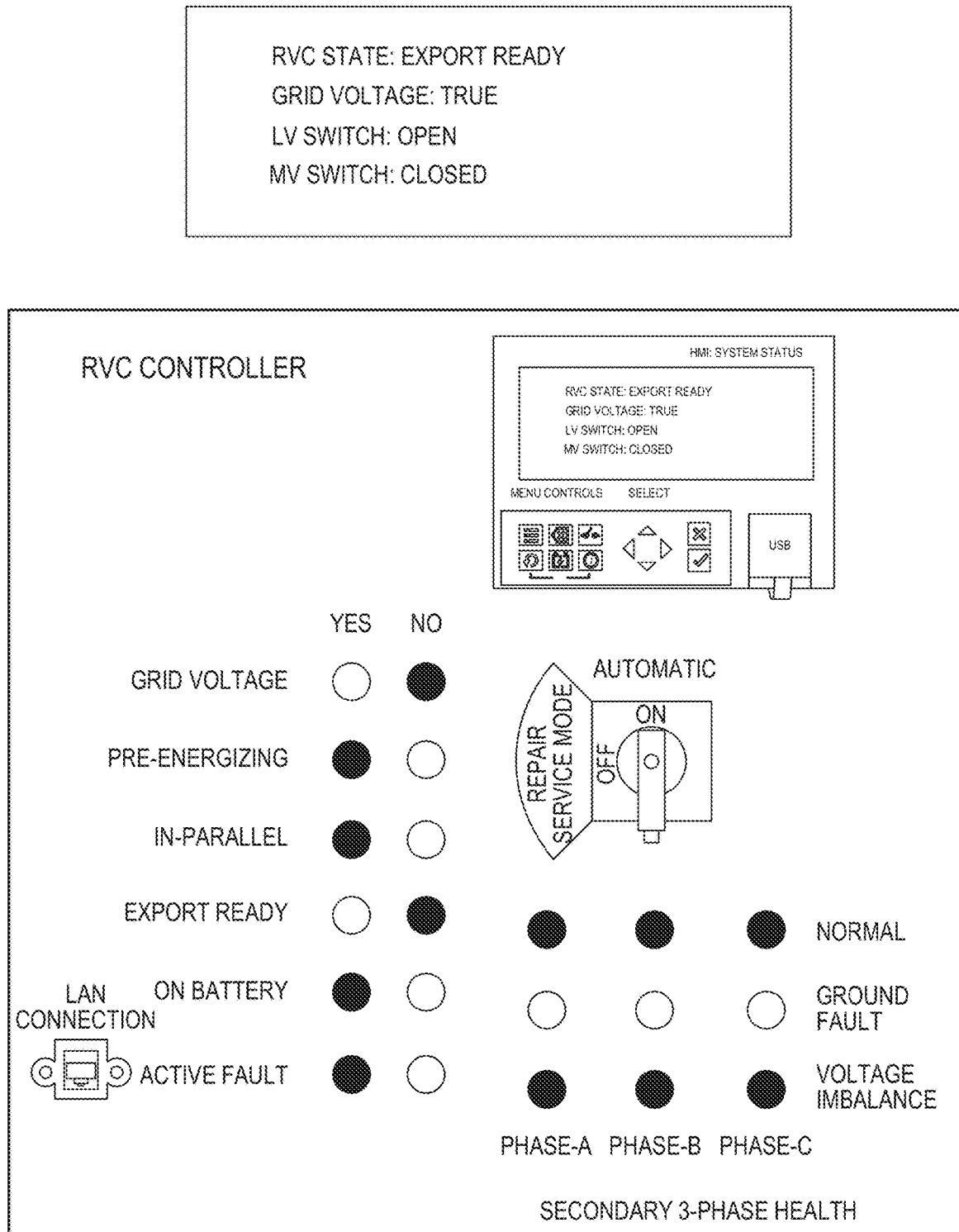
Figure 17:
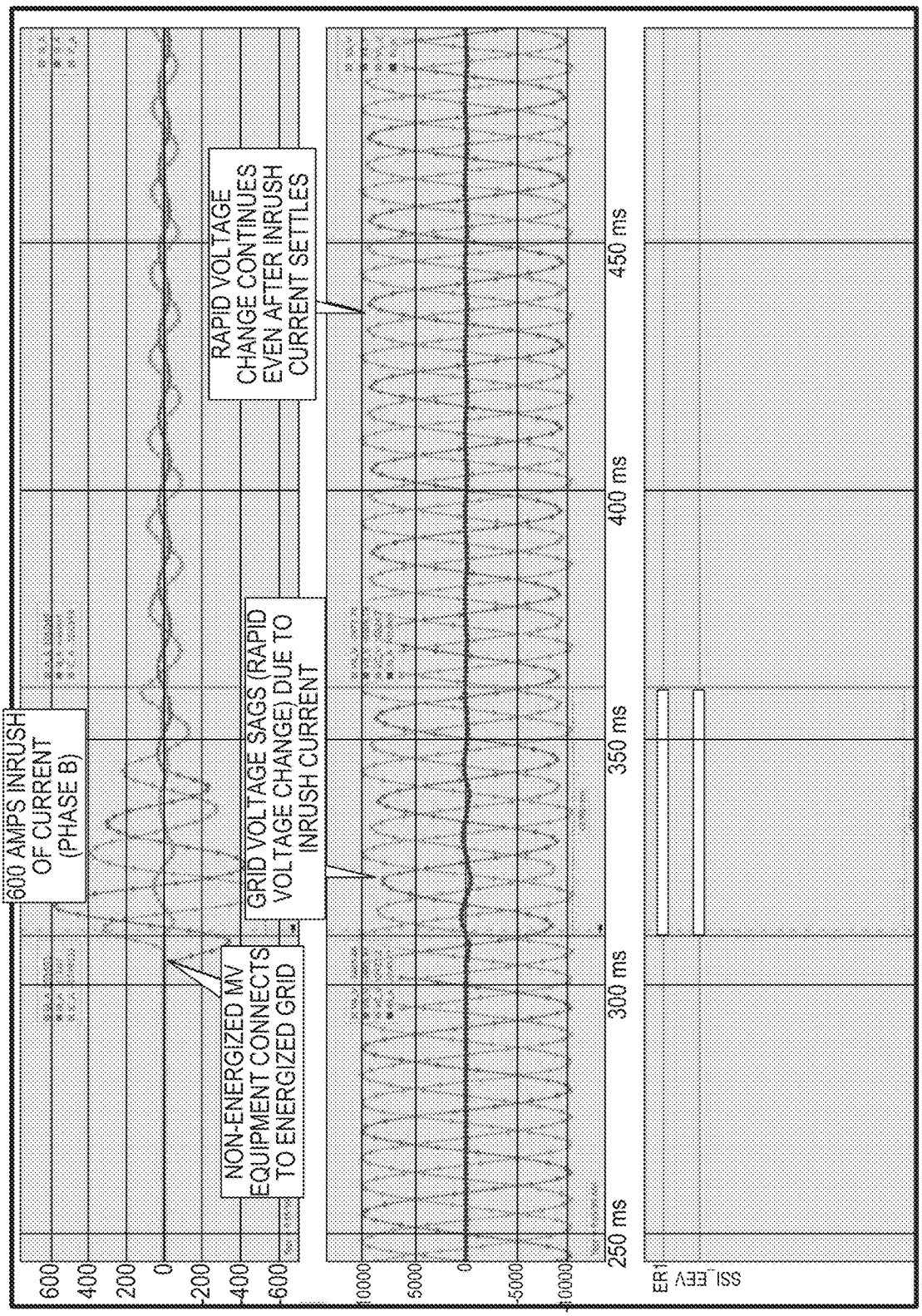
FIGS. 17-20 are graphical illustrations of current and voltage waveforms captured and displayed in a relay events file during a recloser event.

On the other hand, if proper operation occurs (i.e., no problems are encountered), then the PLC 40 will monitor and ensure equalized energization through the programed timing sequence and by communicating with the recloser and low voltage contactors before signaling to complete the connection. As the sequence completes, information about the status of the process and system are conveyed to an on-site operator via the user interface 200. An exemplary implementation of the conveyance of such information is illustrated in FIGS. 12-16, which are front views of the operator interface 200 of FIG. 8 during stages of a recloser event. In FIG. 12, a grid loss has been detected. There is no voltage, and the MV switch 32 is open. In FIG. 13, the grid has been restored, and the programmed sequence is being initiated. A timing delay is provided to validate that the grid is stable and the equipment is available. After the predetermined period of time (for example, 7 seconds), the LV switch 30 is closed, inducing voltage on the secondary side of the first GSU transformer 14, and the operator interface 200 appears as shown in FIG. 14. Next, as represented in FIG. 15, the MW switch 32 is closed after another predetermined delay (for example, 11 seconds), and the GSU 14 is energized on both the primary side and the secondary side in parallel. Finally, after a further delay (for example, 2.0 seconds) to allow the MV voltage wave to achieve stability, the LV switch 30 is opened, with the operator interface 200 appearing as shown in FIG. 16. At this point, the medium voltage loop feed is connected directly to the grid.

FIGS. 17-20 are graphical illustrations of current and voltage waveforms captured and displayed in a relay events file during a recloser event. More particularly, FIG. 17 displays the unmitigated inrush current and the sag in voltage or rapid voltage change on the grid—a power quality phenomenon that may be unacceptable to the interconnecting utility service provider. Non-energized MV equipment is connected to an energized grid after a little more than 300 msec. In the upper graph, 600 amps of inrush current is seen on phase B, with a corresponding sag in grid voltage (rapid voltage change) due to the inrush current shown in the lower graph. Notably, even after the inrush current settles, rapid voltage change continues for 50-100 msec or more thereafter.

Figure 18:
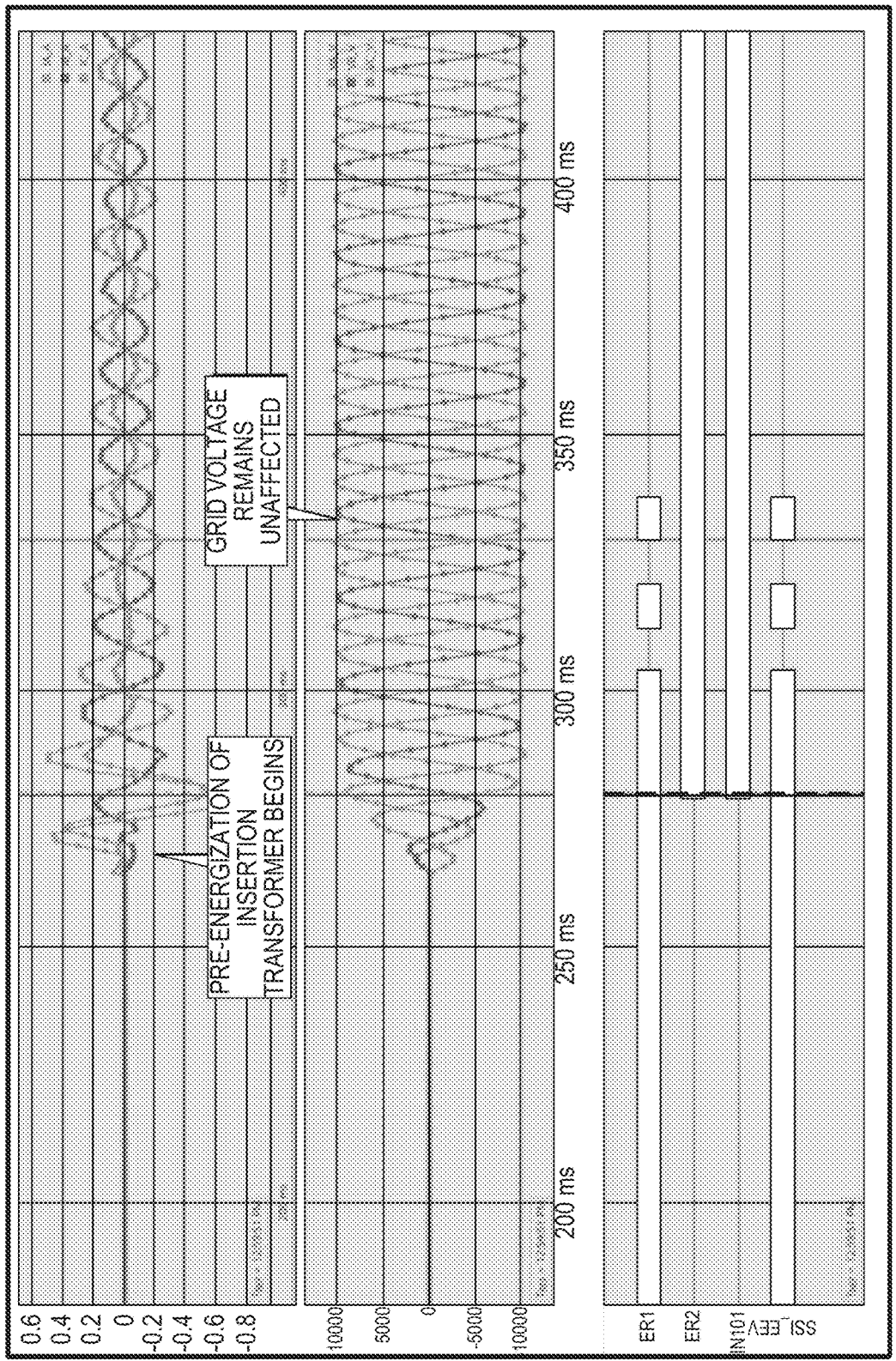
Figure 19:
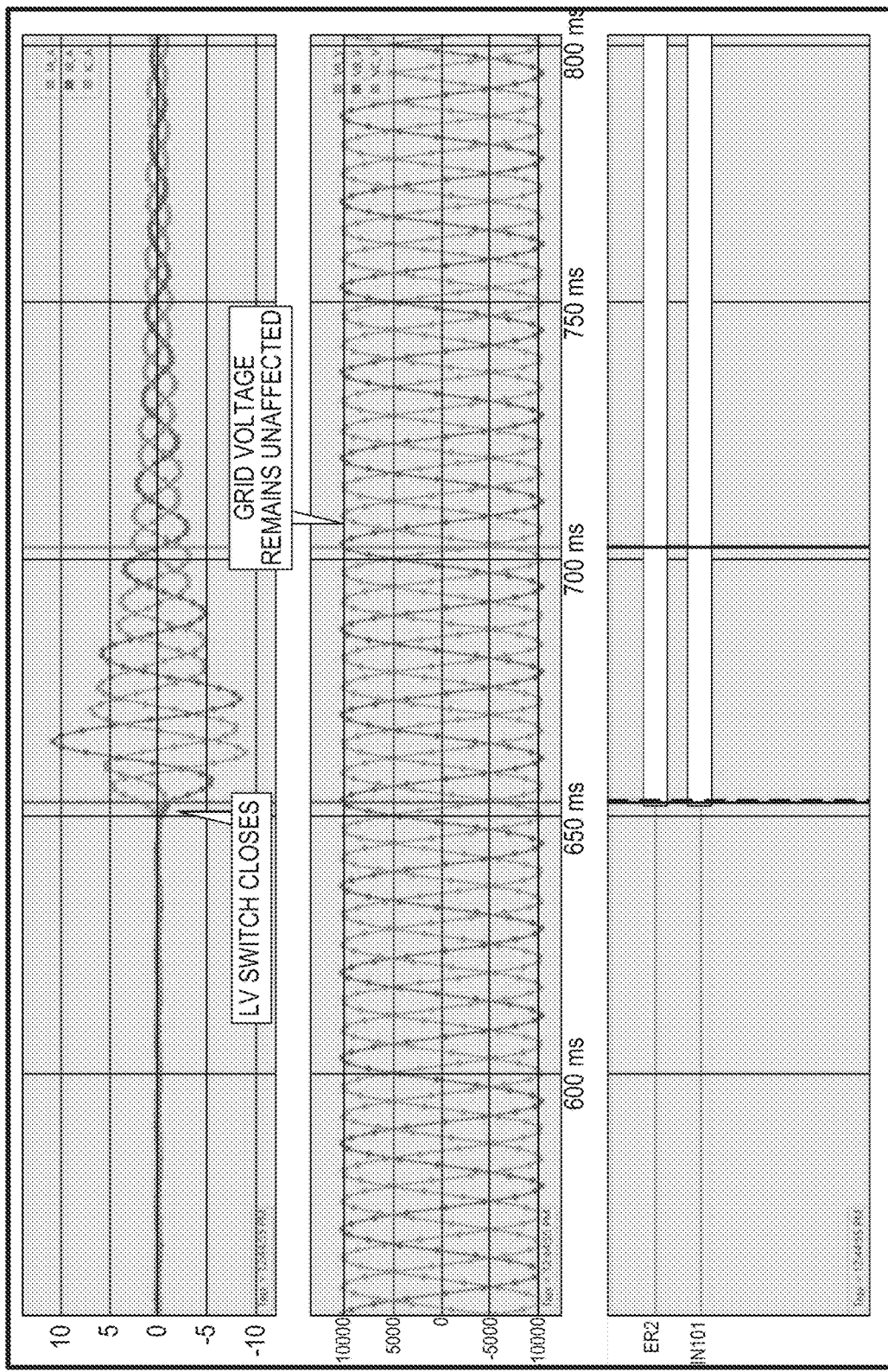
Figure 20:
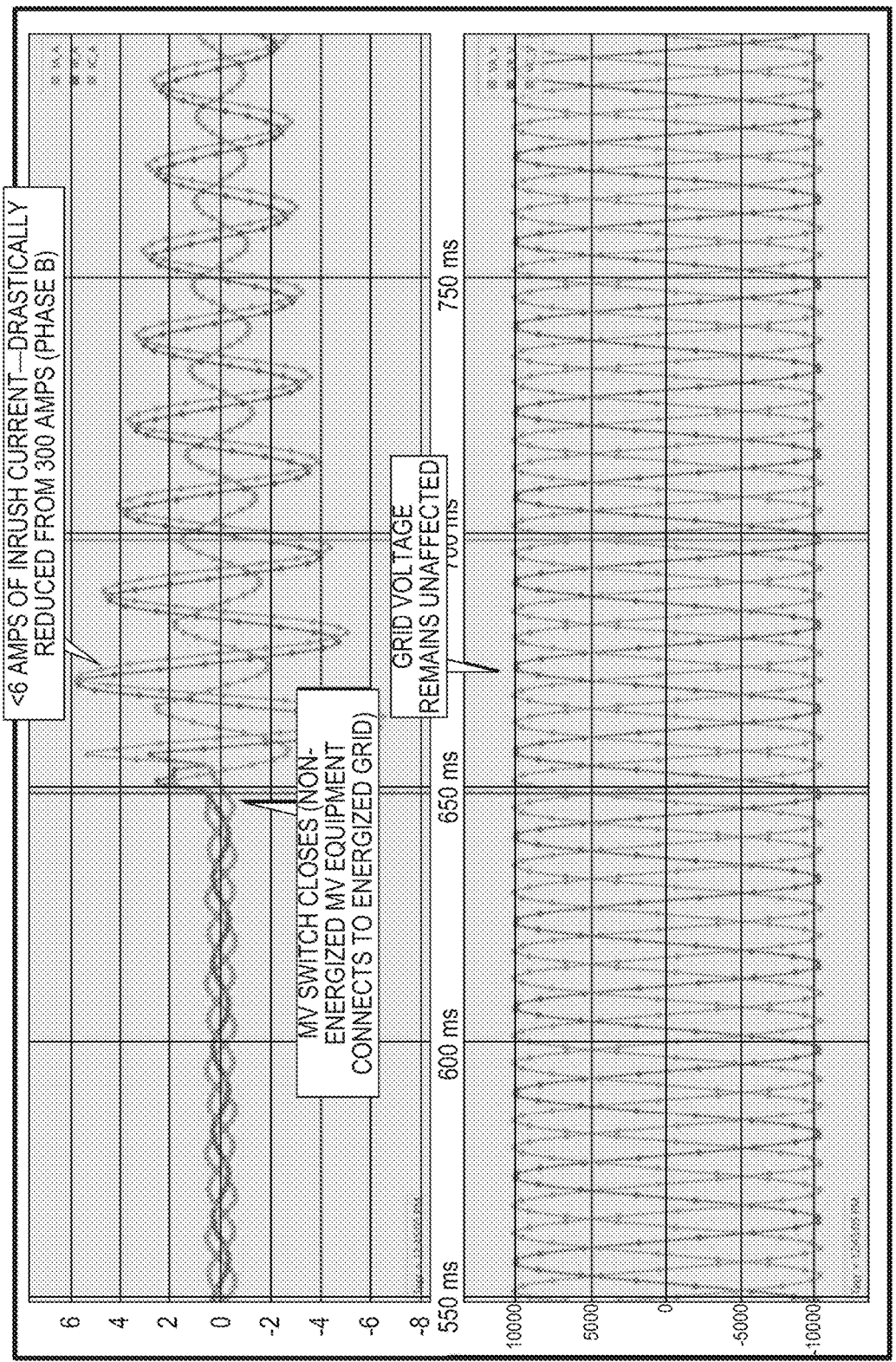

FIGS. 18-20 illustrate the contrast in response when the MVIC control system 12 is utilized. In FIG. 18, the energization of the insertion transformer draws minimal inrush current (<1 amp) when the LV and MV switches 30,32 are open—a default condition upon restoration of power to site. In FIG. 19, the magnitude of the inrush current will be minimized (~10 Amps) through the pre-energization sequence. In FIG. 20, the MV switch 32 closes in parallel with the LV switch 30 after the programed period of time, connecting the MV side of the transformers 14,16 to the energized grid directly. As seen in the relay event file, the phase angle difference between MV and LV induces another small (~6 Amps) inrush of current that has no measurable impact on grid voltage. After another short time delay, the LV switch 30 is opened. The current and voltage changes were so small at this point, that an event threshold could not be set small enough to capture the event in the relay event files.

Example

Field tests were performed to verify the operation of the series impedance injection system and test the transformer inrush current. The tests were conducted at a site whose plant size was 4,802 kW-DC, with an AC plant output of 3,200 kW-AC. The interconnect voltage was 12.47/7.2 kV. A 15 kV series impedance injection system, provided and installed by Solar Operations Solutions, LLC, was utilized. Two GSU transformers were utilized at 1,885/2,300 kVA, 12.47 kV Grounded Wye/600 V Wye, and Z=5.73%. Field testing of the series impedance injection system included a step approach so that events could be captured to analyze the inrush current at the utility point of interconnection. For the analysis all waveforms were instrumented by pole mounted revenue grade voltage transformers and current transformers as measured by a Schweitzer Engineering Laboratories SEL-735 Power Quality Meter located at the utility POI.

Figure 21:
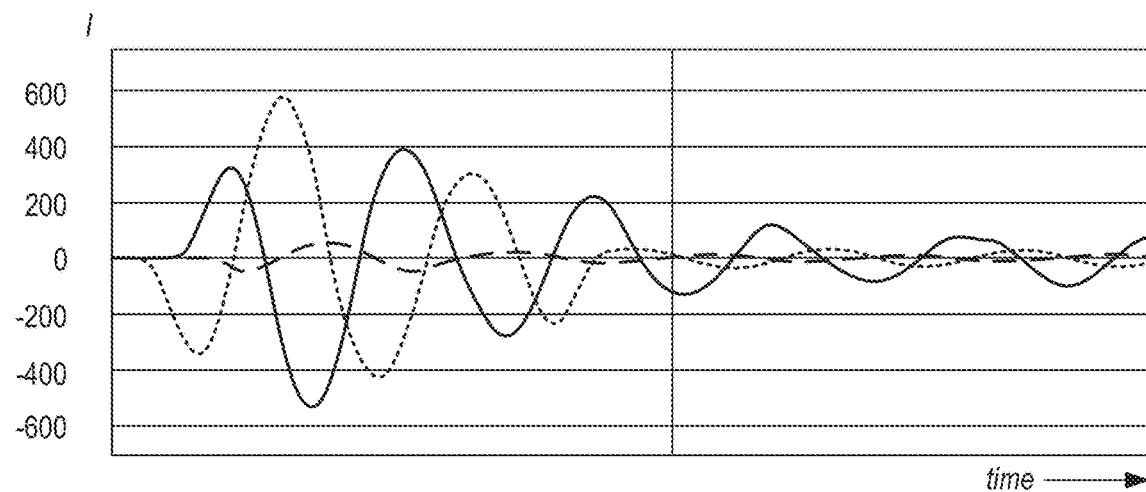
FIGS. 21 and 22 are graphical representations of the sinusoidal waveforms and magnitude waveforms, respectively, of the three phase inrush currents without series impedance injection.
Figure 22:
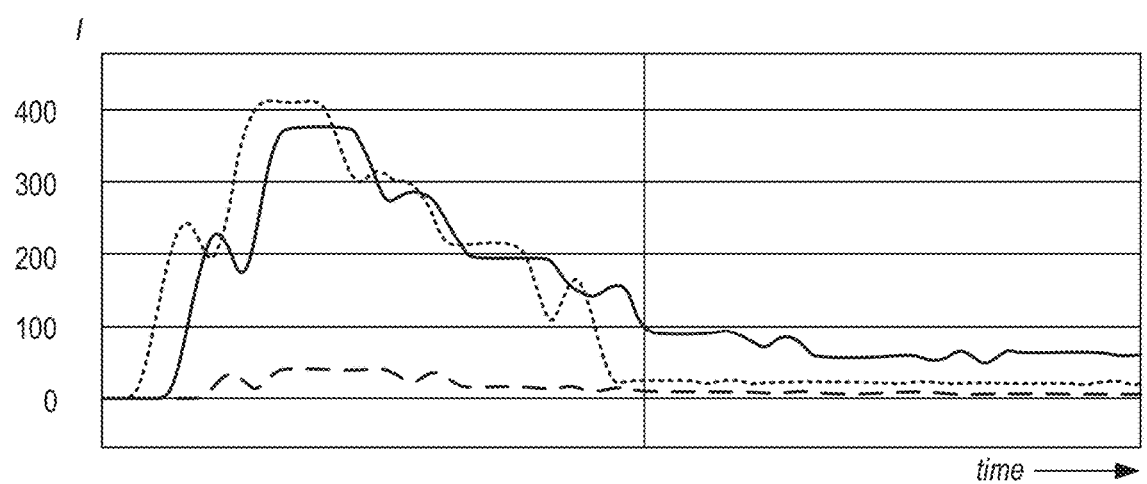

In one part of the experiment, the two (2) 1,885 kVA GSU transformers were connected in parallel and the resulting inrush current was measured at the 12.47 kV utility point of interconnection without a series impedance injection system in place. FIGS. 21 and 22 are graphical representations of the sinusoidal waveforms and magnitude waveforms, respectively, of the three phase inrush currents without series impedance injection.

Figure 23:
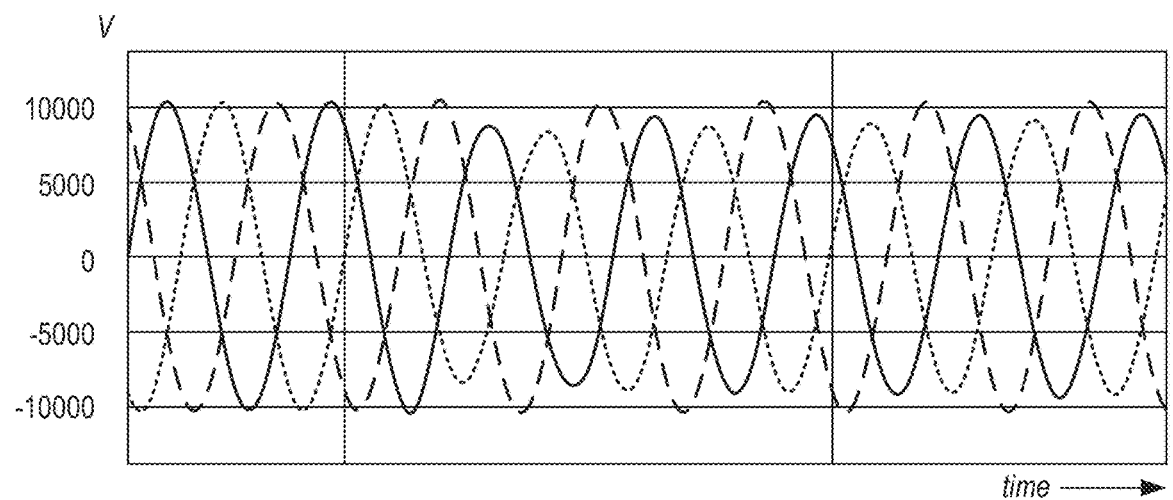
FIGS. 23 and 24 are graphical representations of the sinusoidal waveforms and magnitude waveforms, respectively, of the respective voltages at the utility point of interconnection.
Figure 24:
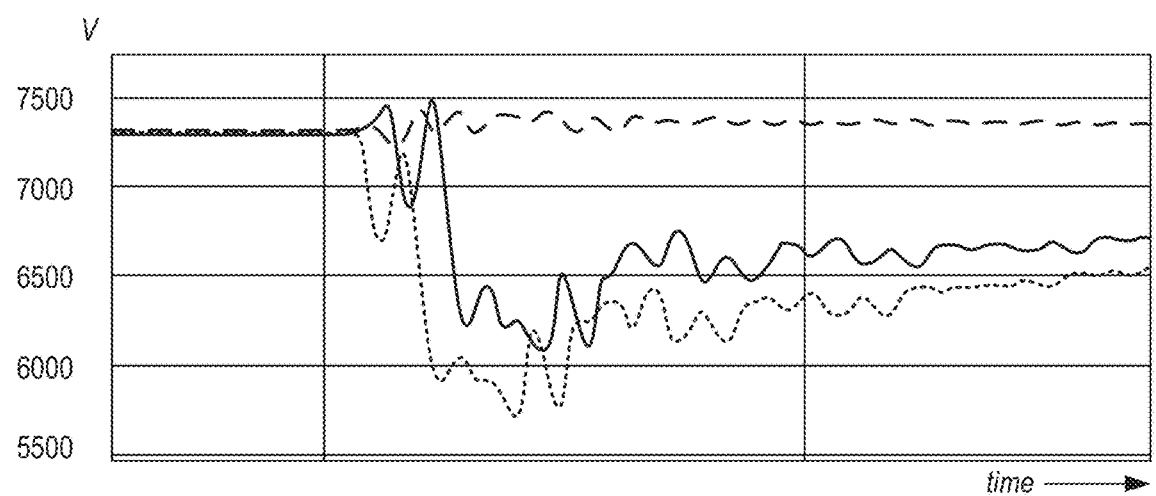

The resulting three phase utility distribution voltages at the point of interconnect were also measured. The effects of the high levels of inrush current flowing to the GSU transformers are shown in FIGS. 23 and 24, which are graphical representations of the sinusoidal waveforms and magnitude waveforms, respectively, of the respective voltages at the utility point of interconnection. As shown therein, the voltage sag without the series impedance injection at the utility POI is approximately 1,400 V, or 20% of the base voltage. These voltage sags at the utility point of interconnection, which are a direct result of the high level of inrush current that is directly related to the GSU transformer inrush current, significantly exceed the utility's power quality standards and can cause disturbances or equipment failures for the utility's connected customers.

Figure 25:
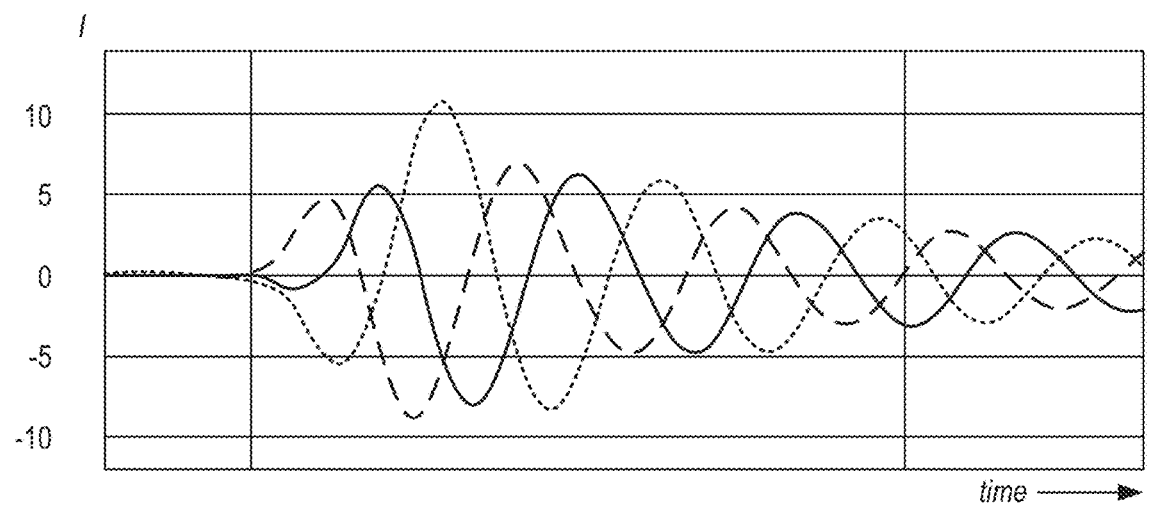
FIGS. 25 and 26 are graphical representations of the sinusoidal waveforms and magnitude waveforms, respectively, of the three phase inrush currents with the series impedance injection system in place.
Figure 26:
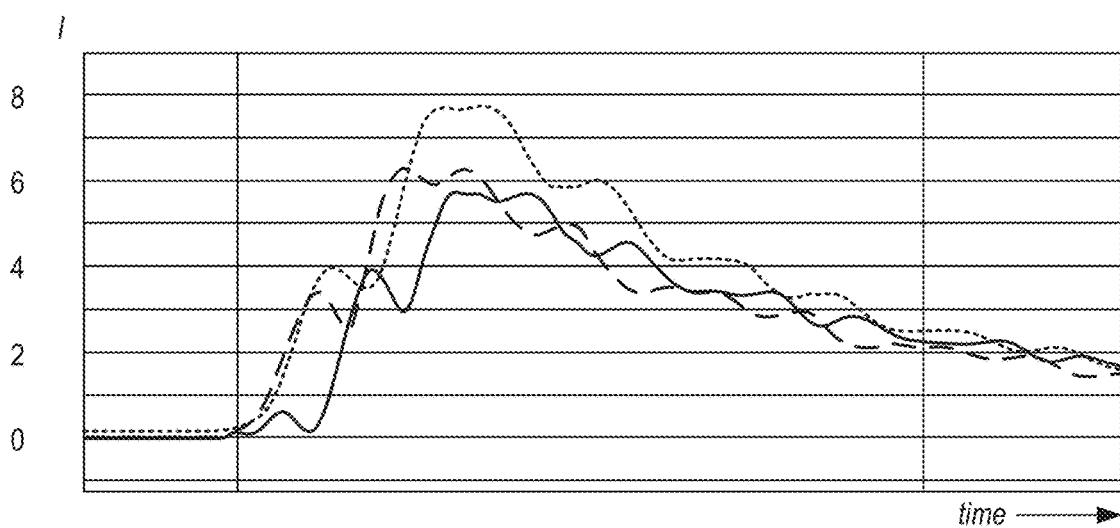

The benefits of the series impedance injection system became clear when the experiment was repeated with the series impedance injection system in place. This time, the two (2) 1,885 kVA GSU transformers were connected in parallel and the resulting inrush current was once again measured at the 12.47 kV utility point of interconnection, but with the series impedance injection. FIGS. 25 and 26 are graphical representations of the sinusoidal waveforms and magnitude waveforms, respectively, of the three phase inrush currents with the series impedance injection system in place. As shown therein, the magnitude of the inrush current is significantly less with the series impedance injection in place than without it in place. More particularly, the inrush current has been reduced to approximately 3% of its previous value.

Figure 27:
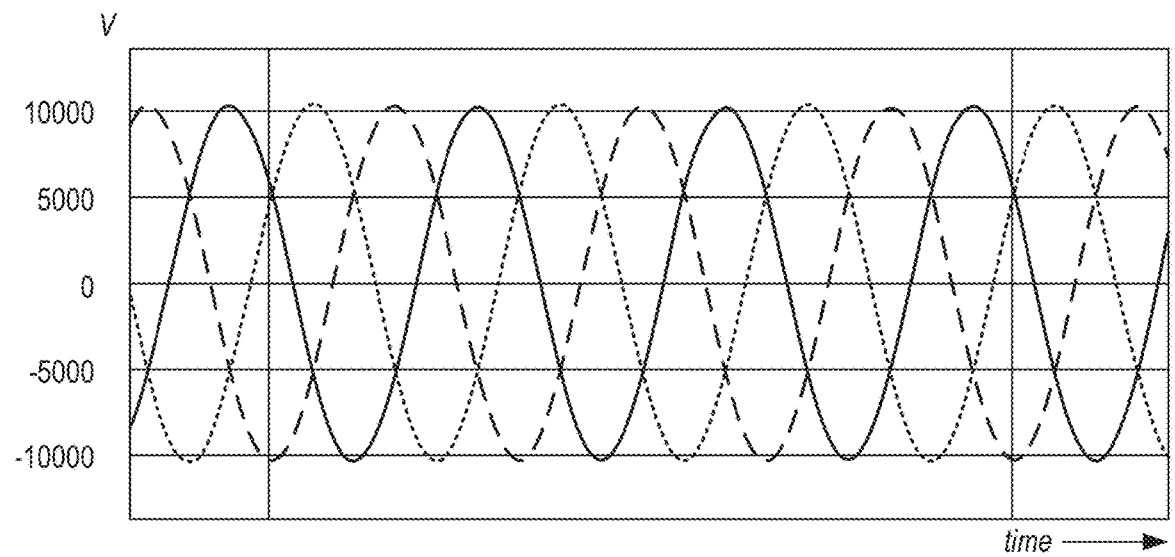
FIGS. 27 and 28 are graphical representations of the sinusoidal waveforms and the magnitude waveforms, respectively, of the respective voltages at the utility point of interconnection with the series impedance injection system in place.
Figure 28:
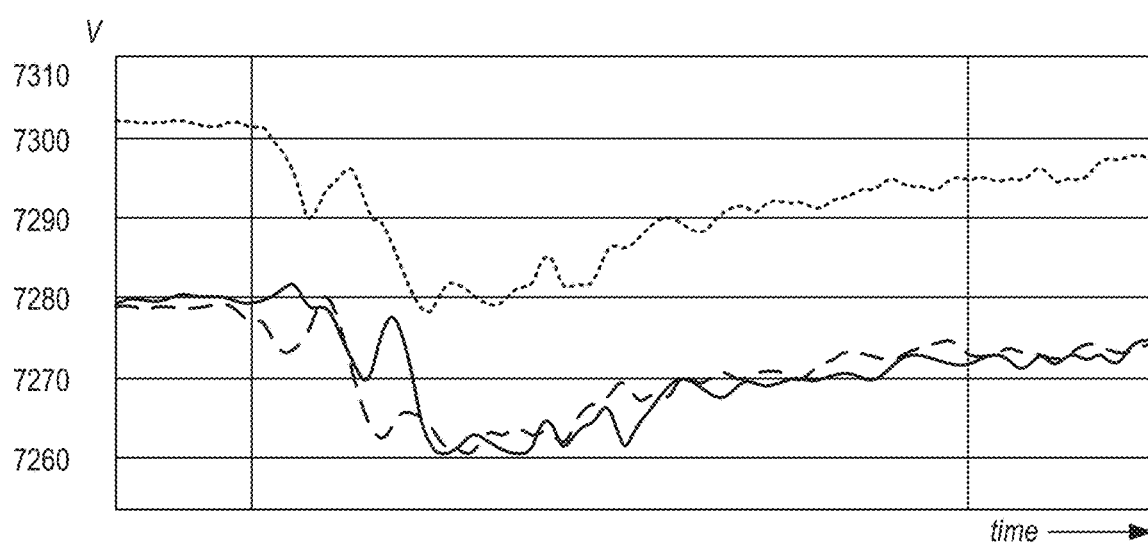

The voltage sag was also analyzed. In this regard, FIGS. 27 and 28 illustrate the effects on the utility distribution voltage at the point of interconnect when the inrush current flowing to the GSU transformers is reduced due the effects of the series impedance injection. More particularly, FIGS. 27 and 28 are graphical representations of the sinusoidal waveforms and the magnitude waveforms, respectively, of the respective voltages at the utility point of interconnection with the series impedance injection system in place. The voltage sag at the utility point of interconnection is orders of magnitude lower due to the series impedance injection system. More particularly, the voltage sag with the series impedance injection at the utility POI is approximately 20 V or less than 0.3% of the base voltage. This voltage sag is well below the utility's power quality standards and should not cause any disturbances or equipment failures for the utility's connected customers.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A method of reducing inrush current using a medium voltage inrush current (MVIC) regulator and interconnection control system interposed between a distributed power generation facility, having a designated generator step-up (GSU) transformer, and a utility grid, the distributed power generation facility being connected to the utility grid at a point of interconnect, the MVIC regulator and interconnection control system having a pre-insertion impedance injection transformer, a low voltage first switch connected between the pre-insertion transformer and secondary coils of the designated GSU transformer, a medium voltage second switch connected inline between the pre-insertion transformer and primary coils of the designated GSU transformer, and a controller, the method comprising the steps of:
(a) following a loss-of-grid event, ensuring that the first and second switches are open; and
(b) via the controller, and in response to restoration of the utility grid following the loss-of-grid event, opening and closing the first and second switches according to an automated pre-energization switching sequence such that magnetic flux in the designated GSU transformer occurs at a reduced rate, thereby reducing inrush of current and undesirable power quality phenomena;
(c) wherein the controller carries out the automated pre-energization switching sequence by:
(i) closing the low voltage switch, starting at a first predetermined period of time after initial energization of the utility grid at the point of interconnect, to energize the secondary coil of the designated GSU transformer;
- (ii) then, after a second predetermined period of time, closing the medium voltage switch to cause the designated GSU transformer to be connected in parallel to the pre-insertion transformer to provide full distribution voltage to the designated GSU transformer; and
- (iii) then, after a third predetermined period of time, opening the low voltage switch to remove the pre-insertion transformer from the parallel circuit.

2. The method of claim 1, wherein ensuring that the first and second switches are open includes, via the controller, opening the first and second switches before the initial energization of the utility grid at the point of interconnect.

3. The method of claim 2, wherein the MVIC regulator and interconnection control system includes one or more metering relay, and wherein execution of the automated pre-energization switching sequence is contingent upon input received by the controller from the one or more metering relay.

4. The method of claim 2, wherein the MVIC regulator and interconnection control system includes one or more protective relay, and wherein execution of the automated pre-energization switching sequence is contingent upon input received by the controller from the one or more protective relay.

5. The method of claim 2, wherein the MVIC regulator and interconnection control system includes an uninterruptible power supply and a battery, and wherein the controller carries out the automated pre-energization switching sequence using power provided by the uninterruptible power supply and battery.

6. The method of claim 5, wherein execution of the automated pre-energization switching sequence is contingent upon input received by the controller from the uninterruptible power supply and battery.

7. The method of claim 1, wherein the first predetermined period of time has a magnitude designed to ensure that the grid is stable and the designated GSU transformer and the elements of the system are available to operate.

8. The method of claim 7, wherein the first predetermined period of time is in the range of 3-15 seconds, inclusive.

9. The method of claim 8, wherein the first predetermined period of time is in the range of 5-10 seconds, inclusive.

10. The method of claim 1, wherein the second predetermined period of time has a magnitude designed to ensure that oscillation is reduced sufficiently relative to steady state.

11. The method of claim 10, wherein the second predetermined period of time is in the range of 5-15 seconds, inclusive.

12. The method of claim 11, wherein the second predetermined period of time is in the range of 10-12 seconds, inclusive.

13. The method of claim 10, wherein the magnitude is designed to ensure that oscillation is reduced to within 2% of steady state.

14. The method of claim 1, wherein the third predetermined period of time has a magnitude designed to ensure that the voltage grid is stable and the designated GSU transformer and the elements of the system are available to operate.

15. The method of claim 14, wherein the third predetermined period of time is in the range of 1-5 seconds, inclusive.

16. The method of claim 15, wherein the third predetermined period of time is in the range of 1.0-2.5 seconds, inclusive.

17. The method of claim 1, further comprising a step of customizing a magnitude of one or more of the first, second, and third predetermined periods of time based on specific characteristics of the photovoltaic power station where the system is installed.

18. The method of claim 1, further comprising a step of displaying, via a user interface, real-time status information during, and based upon, the automated pre-energization switching sequence.

19. A method of reducing inrush current using a medium voltage inrush current (MVIC) regulator and interconnection control system interposed between a distributed power generation facility, having a designated generator step-up (GSU) transformer, and a utility grid, the distributed power generation facility being connected to the utility grid at a point of interconnect, the MVIC regulator and interconnection control system having a pre-insertion impedance injection transformer, a low voltage first switch connected between the pre-insertion transformer and secondary coils of the designated GSU transformer, a medium voltage second switch connected inline between the pre-insertion transformer and primary coils of the designated GSU transformer, and a controller, the method comprising the steps of:
- (a) following a loss-of-grid event, ensuring that the first and second switches are open;
- (b) via the controller, and in response to restoration of the utility grid following the loss-of-grid event, opening and closing the first and second switches according to an automated pre-energization switching sequence such that magnetic flux in the designated GSU transformer occurs at a reduced rate, thereby reducing inrush of current and undesirable power quality phenomena;
- (c) via the controller, communicating, via a wireless communication link, with real-time operator interface software; and
- (d) providing, via the real-time operator interface software, a remote operator with the capability to adjust parameters and timing sequence settings without physically going on site, including providing the remote operator with the ability to remotely issue a command to trigger the automated pre-energization switching sequence or to clear a trip event prior to initiating the automated pre-energization switching sequence.

20. A method of reducing inrush current using a medium voltage inrush current (MVIC) regulator and interconnection control system interposed between a distributed power generation facility, having a designated generator step-up (GSU) transformer, and a utility grid, the distributed power generation facility being connected to the utility grid at a point of interconnect, the MVIC regulator and interconnection control system having a pre-insertion impedance injection transformer, a low voltage first switch connected between the pre-insertion transformer and secondary coils of the designated GSU transformer, a medium voltage second switch connected inline between the pre-insertion transformer and primary coils of the designated GSU transformer, and a controller, the method comprising the steps of:
- (a) following a loss-of-grid event, ensuring that the first and second switches are open;
- (b) via the controller, and in response to restoration of the utility grid following the loss-of-grid event, opening and closing the first and second switches according to an automated pre-energization switching sequence such that magnetic flux in the designated GSU transformer occurs at a reduced rate, thereby reducing inrush of current and undesirable power quality phenomena;

(c) housing the pre-insertion impedance injection transformer, the first and second switches, the controller, and a user interface in a primary voltage cabinet, wherein the pre-insertion impedance injection transformer, the first and second switches, the controller, and the user interface are part of a self-contained assembly; and (d) housing the user interface is housed in a side compartment, of the primary voltage (d) cabinet, that is separated from the rest of an interior of the primary voltage cabinet but is accessible by an exterior door.

* * * * *